US012254841B2

(12) United States Patent
Zheng et al.

(10) Patent No.: US 12,254,841 B2
(45) Date of Patent: Mar. 18, 2025

(54) DISPLAY SUBSTRATE AND DRIVING METHOD THEREFOR, AND DISPLAY APPARATUS

(71) Applicant: BOE Technology Group Co., Ltd., Beijing (CN)

(72) Inventors: Haoliang Zheng, Beijing (CN); Yan Qu, Beijing (CN); Dongni Liu, Beijing (CN); Li Xiao, Beijing (CN); Jiao Zhao, Beijing (CN); Xiaorong Cui, Beijing (CN); Seungwoo Han, Beijing (CN); Minghua Xuan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/274,470

(22) PCT Filed: Dec. 20, 2021

(86) PCT No.: PCT/CN2021/139540
§ 371 (c)(1),
(2) Date: Jul. 27, 2023

(87) PCT Pub. No.: WO2023/115250
PCT Pub. Date: Jun. 29, 2023

(65) Prior Publication Data
US 2024/0096288 A1 Mar. 21, 2024

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/0297* (2013.01); *G09G 2310/061* (2013.01); *G09G 2310/08* (2013.01)

(58) Field of Classification Search
CPC ............... G09G 3/3275; G09G 3/3266; G09G 2310/0297; G09G 2310/061; G09G 2310/08
See application file for complete search history.

(56) References Cited

U.S. PATENT DOCUMENTS

2012/0062536 A1* 3/2012 Park .................... G09G 3/3233 345/82
2013/0215092 A1 8/2013 Wu et al.
(Continued)

FOREIGN PATENT DOCUMENTS

CN 102646389 A 8/2012
CN 103927978 A 7/2014
(Continued)

OTHER PUBLICATIONS

Translation of CN 109801594 A (Year: 2019).*
International Search Report for PCT/CN2021/139540 Mailed Sep. 7, 2022.

*Primary Examiner* — Lixi C Simpson
(74) *Attorney, Agent, or Firm* — Ling Wu; Stephen Yang; Ling and Yang Intellectual Property

(57) ABSTRACT

A display substrate a driving method therefor, and a display apparatus. The display substrate comprises: M rows and N columns of sub-pixels, N data signal lines and a data reset circuit, wherein at least one sub-pixel comprises a pixel circuit; an ith data signal line is connected to pixel circuits in an ith column, where M≥1, N≥1, and 1≤i≤N; and the data reset circuit is electrically connected to a data reset control end, a data initial signal end and the N data signal lines, and is configured to provide a signal of the data initial signal end to the N data signal lines under the control of the data reset control end.

13 Claims, 10 Drawing Sheets

(56) References Cited

U.S. PATENT DOCUMENTS

| | | | | |
|---|---|---|---|---|
| 2015/0187265 | A1 | 7/2015 | Zhang et al. | |
| 2018/0061318 | A1 | 3/2018 | Yin et al. | |
| 2021/0201798 | A1 * | 7/2021 | Kim | G09G 3/3233 |
| 2023/0024029 | A1 | 1/2023 | Yu et al. | |

FOREIGN PATENT DOCUMENTS

| | | | | |
|---|---|---|---|---|
| CN | 105609049 | A | | 5/2016 |
| CN | 109801594 | A | * | 5/2019 |
| CN | 110599941 | A | | 12/2019 |
| CN | 111354309 | A | | 6/2020 |
| JP | 2012233950 | A | | 11/2012 |
| KR | 1020200020191 | A | | 2/2020 |

* cited by examiner

DISPLAY SUBSTRATE AND DRIVING METHOD THEREFOR, AND DISPLAY APPARATUS

CROSS-REFERENCE TO RELATED APPLICATIONS

The present application is a U.S. National Phase Entry of International Application PCT/CN2021/139540 having an international filing date of Dec. 20, 2021, and the contents disclosed in the above-mentioned application are hereby incorporated as a part of this application.

TECHNICAL FIELD

The present disclosure relates to, but is not limited to, the field of display technology, and more particularly, to a display substrate, a driving method thereof and a display device.

BACKGROUND

At present, the display market is thriving. In addition, as consumers' demands for various display products such as laptop computers, smart phones, televisions, tablet computers, smart watches and fitness wristbands constantly increase, more new display products will emerge in the future.

SUMMARY

The following is a summary of subject matters described in the present disclosure in detail. The summary is not intended to limit the protection scope of the claims.

In a first aspect, the present disclosure provides a display substrate, which includes M rows and N columns of sub-pixels, N data signal lines and at least one data reset circuit, wherein at least one sub-pixel includes a pixel circuit; the i-th data signal line is connected to the i-th column of pixel circuits, M≥1, N≥1 and 1≤i≤N; and the data reset circuit, electrically connected to a data reset control terminal, a data initial signal terminal and the N data signal lines, is configured to provide a signal of the data initial signal terminal to the N data signal lines under the control of the data reset control terminal.

In some possible implementations, the data reset circuit includes N data reset transistors; and a control electrode of the i-th data reset transistor is electrically connected to the data reset control terminal, a first electrode of the i-th data reset transistor is electrically connected to the data initial signal terminal, and a second electrode of the i-th data reset transistor is electrically connected to the i-th data signal line.

In some possible implementations, the at least one sub-pixel further includes a light emitting element, and the pixel circuit is configured to drive the light emitting element to emit light;

the pixel circuit includes a first transistor, a second transistor, a third transistor, a fourth transistor, a fifth transistor, a sixth transistor, a seventh transistor and a capacitor; a control electrode of the first transistor is connected to a reset signal terminal, a first electrode of the first transistor is connected to an initial signal terminal, and a second electrode of the first transistor is connected to a first node;

a control electrode of the second transistor is connected to a scan signal terminal, a first electrode of the second transistor is connected to the first node, and a second electrode of the second transistor is connected to a second node;

a control electrode of the third transistor is connected to the first node, a first electrode of the third transistor is connected to a third node, and a second electrode of the third transistor is connected to the second node;

a control electrode of the fourth transistor is connected to the scan signal terminal, a first electrode of the fourth transistor is connected to a data signal terminal, and a second electrode of the fourth transistor is connected to the third node;

a control electrode of the fifth transistor is connected to a light emitting signal terminal, a first electrode of the fifth transistor is connected to a first power supply terminal, and a second electrode of the fifth transistor is connected to the third node;

a control electrode of the sixth transistor is connected to the light emitting signal terminal, a first electrode of the sixth transistor is connected to the second node, and a second electrode of the sixth transistor is connected to a first electrode of the light emitting element.

a control electrode of the seventh transistor is connected to the reset signal terminal, a first electrode of the seventh transistor is connected to the initial signal terminal, and a second electrode of the seventh transistor is connected to the first electrode of the light emitting element; and a first terminal of the capacitor is connected to the first power supply terminal, and a second terminal of the capacitor is connected to the first node;

the light emitting element is connected to the pixel circuit and a second power supply terminal respectively; and the i-th data signal line is electrically connected to the data signal terminal of the i-th column of pixel circuits.

In some possible implementations, the display substrate further includes a multiplexer circuit;

the multiplexer circuit, electrically connected to R multiplex control terminals, S data output terminals and the N data signal lines respectively, is configured to output signals of the S data output terminals to the N data signal lines in a way of time sharing under the control of the R multiplex control terminals, S=N/R and R being a positive integer greater than or equal to 2.

In some possible implementations, when R=2, the two reset control terminals are a first reset control terminal and a second reset control terminal respectively, and the multiplexer circuit includes S first multiplex transistors and S second multiplex transistors;

a control electrode of the t-th first multiplex transistor is electrically connected to the first reset control terminal, a first electrode of the t-th first multiplex transistor is electrically connected to the (2t−1)-th data signal line, and a second electrode of the t-th first multiplex transistor is electrically connected to the t-th column of data output terminals, 1≤t≤S; and a control electrode of the t-th second multiplex transistor is electrically connected to the second reset control terminal, a first electrode of the t-th second multiplex transistor is electrically connected to the 2t-th data signal line, and a second electrode of the t-th second multiplex transistor is electrically connected to the t-th column of data output terminals.

In some possible implementations, the data reset circuit and the multiplexer circuit are located at both sides of the N data signal lines respectively, and the data reset circuit and the multiplexer circuit are arranged along an extension direction of the data signal lines.

In some possible implementations, the data reset circuit is electrically connected to first ends of the N data signal lines, and the multiplexer circuit is electrically connected to second ends of the N data signal lines.

In some possible implementations, for at least one pixel circuit, cut-off time before which the reset signal terminal receives active level signals is not later than start time at which the scan signal terminal receives the active level signals, and cut-off time before which the scan signal terminal receives the active level signals is not later than start time at which the light emitting signal terminal receives the active level signals;

time at which the R multiplex control terminals receive the active level signals is within time at which the scan signal terminal receives the active level signals, and there is no overlap among time at which different multiplex control terminals receive the active level signals; and cut-off time before which the x-th multiplex control terminal receives the active level signals is not later than start time at which the (x+1)-th multiplex control terminal receives the active level signals, $1 \le x \le R-1$.

In some possible implementations, time at which the data reset control terminal receives the active level signals does not overlap with the time at which the R multiplex control terminals receive the active level signals.

In some possible implementations, the time at which the data reset control terminal receives the active level signals is within the time at which the scan signal terminal receives the active level signals.

In some possible implementations, cut-off time before which the data reset control terminal receives the active level signals is not later than start time at which the first multiplex control terminal receives the active level signals, or start time at which the data reset control terminal receives the active level signals is later than cut-off time before which the R-th multiplex control terminal receives the active level signals.

In some possible implementations, the time at which the data reset control terminal receives the active level signals is within time at which the reset signal terminal receives the active level signals.

In some possible implementations, the time at which the data reset control terminal receives the active level signals is within time at which the light emitting signal terminal receives the active level signals.

In some possible implementations, a duration during which the data reset control terminal receives the active level signals is greater than or equal to a duration during which the multiplex control terminal receives the active level signals.

In some possible implementations, the initial signal terminal and the data initial signal terminal are connected to the same signal line.

In some possible implementations, the light emitting element includes a miniature light emitting diode, a mini light emitting diode, an organic electroluminescent diode or a quantum dot light emitting diode.

In a second aspect, the present disclosure further provides a display device including the display substrate described above.

In a third aspect, the present disclosure further provides a driving method of a display substrate, which is configured to drive the display substrate descried above, the method including:

a data reset circuit providing a signal of a data initial signal terminal to N data signal lines under the control of a data reset control terminal.

Other aspects may become clear after the accompanying drawings and the detailed description are read and understood.

BRIEF DESCRIPTION OF DRAWINGS

The accompanying drawings are intended to provide an understanding of technical schemes of the present application and form a part of the specification, and are used to explain the technical schemes of the present disclosure together with examples of the present disclosure, and not intended to form limitations to the technical schemes of the present disclosure.

DETAILED DESCRIPTION

Figure 1:
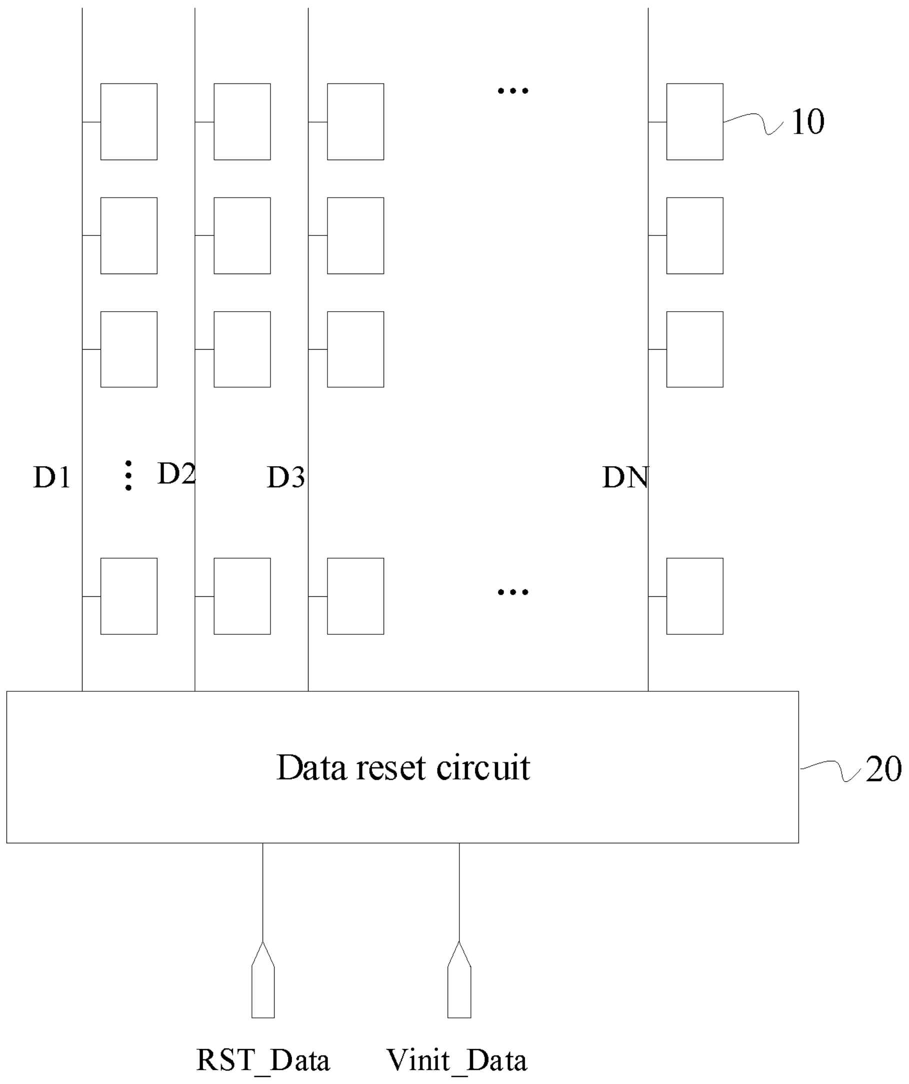
FIG. 1 is a schematic structure diagram of a display substrate in accordance with an example of the present disclosure.

In order to make objects, technical schemes and advantages of the present disclosure more clear, examples of the present disclosure will be described below in detail in combination with the drawings. It should be noted that embodiments may be implemented in a number of different forms. Those of ordinary skills in the art may readily understand the fact that implementations and contents may be transformed into various forms without departing from the purpose and scope of the present disclosure. Therefore, the present disclosure should not be interpreted as being limited to the contents recorded in following embodiments only. The examples in the present disclosure and features in the examples can be arbitrarily combined with each other without conflicts.

Sometimes for the sake of clarity, the size of each constituent element, the thickness of a layer or a region in the drawings may be exaggerated. Therefore, one implementation of the present disclosure is not necessarily limited to the size, and the shape and size of each component in the drawings do not reflect the true proportion. In addition, the drawings schematically illustrate ideal examples, and one implementation of the present disclosure is not limited to the shapes or numerical values shown in the drawings.

Ordinal numerals such as "first", "second", "third" and the like in the specification are set in order to avoid confusion of the constituent elements, but not to set a limit in quantity.

For convenience, the terms such as "middle", "upper", "lower", "front", "back", "vertical", "horizontal", "top", "bottom", "inside", "outside" and the like indicating orientation or position relationships are used in the specification to illustrate position relationships between the constituent elements with reference to the drawings, and are intended to facilitate description of the specification and simplification of the description, but not to indicate or imply that the mentioned device or element must have a specific orientation or be constructed and operated in a specific orientation, therefore, they should not be understood as limitations to the present disclosure. The position relationships between the constituent elements are appropriately changed according to directions of the constituent elements described. Therefore, words and phrases used in the specification are not limited and appropriate substitutions may be made according to situations.

Unless otherwise specified and defined explicitly, the terms "installed", "coupled" and "connected" should be understood in a broad sense in the specification. For example, the connection may be a fixed connection, a detachable connection or an integrated connection, or may be a mechanical connection or an electrical connection, or may be a direct connection, an indirect connection through intermediate components, or communication inside two components. The specific meanings of the above terms in the present disclosure can be understood by a person of ordinary skill in the art according to the specific situations.

In the specification, a transistor refers to a component which at least includes three terminals, a gate electrode, a drain electrode and a source electrode. The transistor has a channel region between the drain electrode (drain electrode terminal, drain region or drain) and the source electrode (source electrode terminal, source region or source), and a current can flow through the drain electrode, the channel region and the source electrode. It should be noted that in the specification, the channel region refers to a region which the current flows mainly through.

In the specification, the first electrode may be a drain electrode and the second electrode may be a source electrode, or the first electrode may be a source electrode and the second electrode may be a drain electrode. In the case that transistors with opposite polarities are used or the case that a current direction is changed during circuit operation, functions of the "source electrode" and the "drain electrode" are sometimes interchanged. Therefore, the "source electrode" and the "drain electrode" can be interchanged in the specification.

In the specification, "electrical connection" includes a case where the constituent elements are connected together through an element with a certain electrical effect. The "element with the certain electrical effect" is not particularly limited as long as electrical signals can be sent and received between the connected constituent elements. Examples of the "element with the certain electrical action" not only include an electrode and a wiring, but also include a switching element such as a transistor, a resistor, an inductor, a capacitor, other elements with one or more functions, etc.

For a display product with high resolution and splicing screen, in order to save wiring space, a multiplexer circuit is usually used to drive the display product. In the case that the multiplexer circuit is used, when a data signal outputted to the same data signal line in the multiplexer circuit are switched from a high level to a low level, there will be a situation where the low-level data signal cannot be properly written to a pixel circuit, thereby resulting in abnormal writing of the data signal and reducing the display effect of the display product.

FIG. 1 is a schematic structure diagram of a display substrate in accordance with an example of the present disclosure. As shown in FIG. 1, the display substrate in accordance with the example of the present disclosure may include M rows and N columns of sub-pixels 10, N data signal lines D1 to DN and at least one data reset circuit 20, wherein at least one sub-pixel includes a pixel circuit; the i-th data signal line is connected to the i-th column of pixel circuits, M≥1, N≥1 and 1≤i≤N. The data reset circuit 20, electrically connected to a data reset control terminal RST-_Data, a data initial signal terminal Vinit_Data and the N data signal lines D1 to DN, is configured to provide a signal of the data initial signal terminal Vinit_Data to the N data signal lines D1 to DN under the control of the data reset control terminal.

Figure 2:
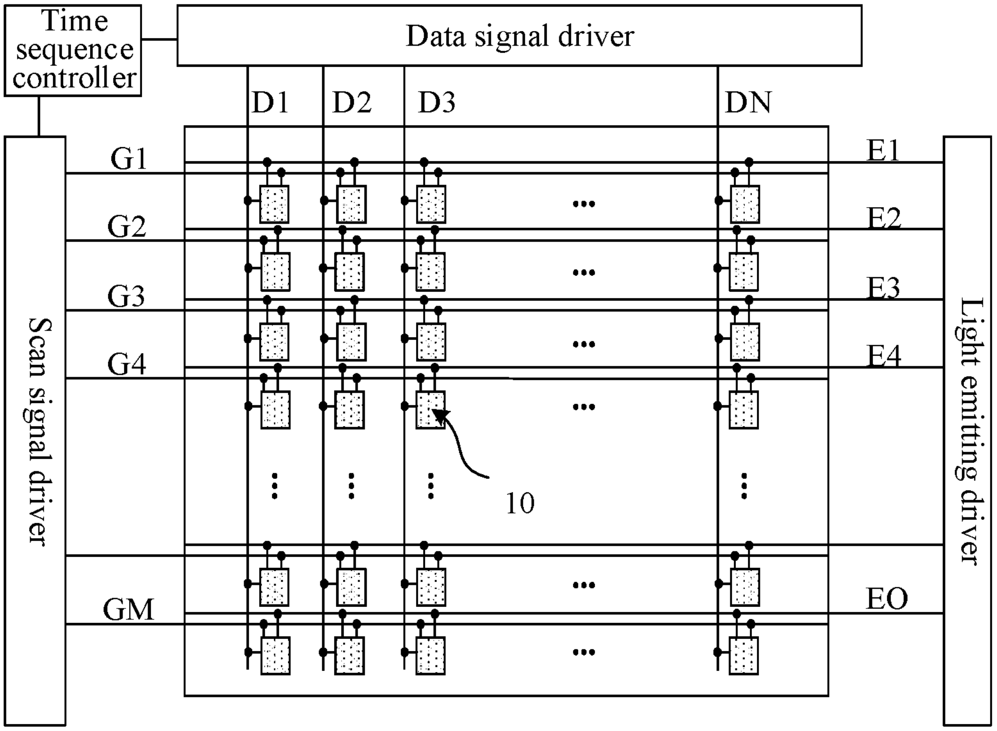
FIG. 2 is a schematic structure diagram of a display substrate in accordance with an exemplary example.

FIG. 2 is a schematic structure diagram of a display substrate in accordance with an exemplary example. As shown in FIG. 2, in an exemplary example, the display substrate may further include a time sequence controller, a data signal driver, a scan signal driver and a light emitting signal driver. The M rows and N columns of sub-pixels 10 are connected to a plurality of scan signal lines (G1 to GM), a plurality of data signal lines (D1 to DN), a plurality of light emitting signal lines (E1 to EO), respectively.

In an exemplary example, the time sequence controller may provide grayscale values and control signals suitable for the specification of the data signal driver to the data signal driver, may provide clock signals and scan start signals and the like suitable for the specification of the scan signal driver to the scan signal driver, and may further provide clock signals and emission stop signals and the like suitable for the specification of the light emitting signal driver to the light emitting signal driver. It can be understood that the display substrate as a whole being driven in a way of line-by-line scanning is described as an example in examples of the present disclosure.

In an exemplary example, the data signal driver may generate data voltages to be provided to the data signal lines D1, D2, . . . , DN using the grayscale values and control signals received from the time sequence controller, wherein N may be a natural number.

In an exemplary example, the scan signal driver may generate scan signals to be provided to the scan signal lines S1, S2, S3, . . . , SM by receiving the clock signals and the scan start signals and the like from the time sequence controller. For example, the scan signal driver may sequentially provide the scan signals to the scan signal lines S1 to SM. For example, the scan signal driver may be composed of a plurality of cascaded shift registers, and may cause each of the shift registers to sequentially generate the scan signals under the control of the clock signals, wherein M may be a natural number.

In an exemplary example, the light emitting signal driver may generate light emitting signals to be provided to the light emitting signal lines E1, E2, E3, . . . , EO by receiving the clock signals and the emission stop signals and the like from the time sequence controller. For example, the light emitting signal driver may sequentially provide the light emitting signals to the light emitting signal lines E1 to EO. For example, the light emitting signal driver may be composed of a plurality of cascaded shift registers, and may cause each of the shift registers to sequentially generate the light emitting signals under the control of the clock signals, wherein O may be a natural number and M may be equal to O.

In an exemplary example, each sub-pixel may be connected to a corresponding data signal line, a corresponding scan signal line and a corresponding light emitting signal line.

In an exemplary example, the sub-pixel may be in the shape of a rectangle, a rhombus, a pentagon or a hexagon.

In an exemplary example, the sub-pixel may be any one of a red (R) sub-pixel, a green (G) sub-pixel, a blue (B) sub-pixel and a white sub-pixel, the present disclosure is not limited thereto. When a red (R) sub-pixel, a green (G) sub-pixel and a blue (B) sub-pixel are included in the display substrate, the three sub-pixels may be arranged side by side horizontally, side by side vertically, or in the shape of the Chinese character "品". When a red (R) sub-pixel, a green (G) sub-pixel, a blue (B) sub-pixel and a white sub-pixel are included in the display substrate, the four sub-pixels may be arranged side by side horizontally, side by side vertically, or in an array, the present disclosure is not limited thereto.

In an exemplary example, the sub-pixel may further include a light emitting element. The pixel circuit, electrically connected to the light emitting element in the same pixel unit, is configured to provide a drive signal to the light emitting element to drive the light emitting element to work.

In an exemplary example, the light emitting element, which may include a current-driven device, may be a current-type light emitting diode, such as a micro light emitting diode (Micro LED), or a mini light emitting Diode (Mini LED), or an Organic light emitting diode (OLED), or a quantum light emitting diode (QLED).

Figure 3:
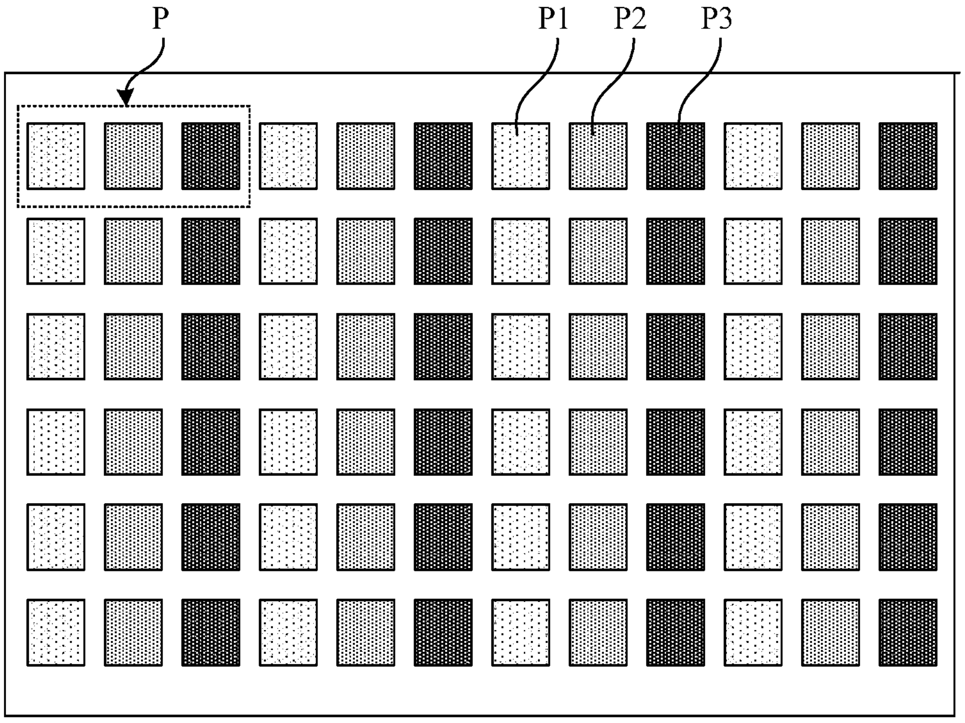
FIG. 3 is a schematic planar structure diagram of a display substrate.

FIG. 3 is a schematic planar structure diagram of a display substrate. As shown in FIG. 3, the display substrate may include a plurality of pixel units P arranged in a matrix, at least one of the plurality of pixel units P includes a first sub-pixel P1 emitting light of a first color, a second sub-pixel P2 emitting light of a second color and a third sub-pixel P3 emitting light of a third color. The first sub-pixel P1, the second sub-pixel P2 and the third sub-pixel P3 each include a pixel circuit and a light emitting element. The pixel circuits in the first sub-pixel P1, the second sub-pixel P2 and the third sub-pixel P3 are connected to the scan signal lines, the data signal lines and the light emitting signal lines, respectively. The pixel circuit is configured to receive the data voltages transmitted by the data signal lines under the control of the scan signal lines and the light emitting signal lines, and output a corresponding current to the light emitting element. The light emitting elements in the first sub-pixel P1, the second sub-pixel P2 and the third sub-pixel P3 are respectively connected to the pixel circuits of the sub-pixels where the light emitting elements are located. The light emitting element is configured to emit light of corresponding luminance in response to a current output by the pixel circuit of the sub-pixel where the light emitting element is located.

In an exemplary example, when the light emitting element is a Micro LED or a Mini LED, the light emitting element in the red sub-pixel is a red light emitting diode, the light emitting element in the blue sub-pixel is a blue light emitting diode, and the light emitting element in the green sub-pixel is a green light emitting diode, or the light emitting elements of the red sub-pixel, the blue sub-pixel, the green sub-pixel and the white sub-pixel, each being blue light emitting diodes, implement emergent light of a corresponding color such as red, blue, green and white by matching color conversion materials (e.g., quantum dots and fluorescent powder and the like).

In an exemplary example, when the light emitting elements are OLEDs, the light emitting element in the red sub-pixel is a red OLED, the light emitting element in the blue sub-pixel is a blue OLED, and the light emitting element in the green sub-pixel is a green OLED.

In an exemplary example, when the light emitting elements are QLEDs, the light emitting element in the red sub-pixel is a red QLED, the light emitting element in the blue sub-pixel is a blue QLED, and the light emitting element in the green sub-pixel is a green QLED.

In an exemplary example, the display substrate may be an OLED display substrate or a QLED display substrate.

Figure 4:
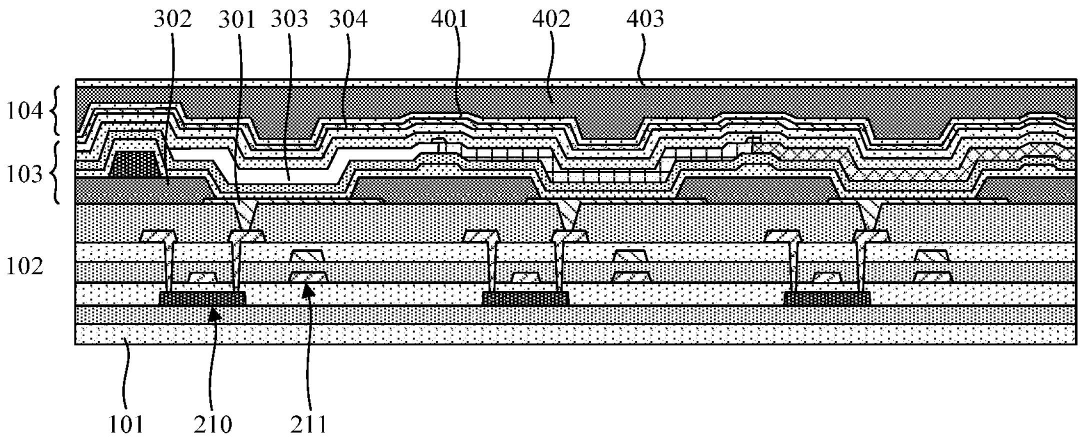
FIG. 4 is a schematic cross-section structure diagram of a display substrate.

When the display substrate is an OLED display substrate, FIG. 4 is a schematic cross-section structure diagram of the display substrate, which illustrates structures of three sub-pixels of the OLED display substrate. As shown in FIG. 4, in a plane perpendicular to the display substrate, the display substrate may include a base substrate 101, a driving circuit layer 102 disposed on the base substrate 101, a light emitting structure layer 103 disposed on one side of the driving circuit layer 102 away from the base substrate 101 and an encapsulation layer 104 disposed on one side of the light emitting structure layer 103 away from the base substrate 101.

In an exemplary example, the base substrate may be a rigid underlay substrate or a flexible underlay substrate. The rigid base substrate may be, but be not limited to, one or more of glass and metal foil; the flexible base substrate may be made of, but be not limited to, one or more of polyethylene terephthalate, ethylene terephthalate, polyether ether ketone, polystyrene, polycarbonate, polyarylate, polyarylester, polyimide, polyvinyl chloride, polyethylene and textile fibers.

In an exemplary example, the display substrate may further include other film layers, such as spacer pillar, the present disclosure is not limited thereto.

In an exemplary example, the driving circuit layer 102 of each sub-pixel may include a plurality of transistors and a storage capacitor, which constitute the pixel circuit. One transistor 101 and one storage capacitor 101A are shown only in FIG. 4 as an example. The light emitting structure layer 103 may include an anode 301, a pixel definition layer 302, an organic light emitting layer 303 and a cathode 304. The anode 301 is connected to a drain electrode of a driving transistor 210 through a via, the organic light emitting layer 303 is connected to the anode 301, and the cathode 304 is connected to the organic light emitting layer 303. The organic light emitting layer 303 emits light of a corresponding color under the driving of the anode 301 and the cathode 304. The encapsulation layer 104 may include a first encapsulation layer 401, a second encapsulation layer 402 and a third encapsulation layer 403 that are stacked.

The first encapsulation layer 401 and the third encapsulation layer 403 may be made of inorganic materials, and the second encapsulation layer 402 may be made of an organic material. The second encapsulation layer 402 is disposed between the first encapsulation layer 401 and the third encapsulation layer 403 so as to ensure that external water vapor cannot enter the light emitting structure layer 103.

In an exemplary embodiment, the organic light emitting layer 303 may include a hole injection layer (HIL), a hole transport layer (HTL), an electron block layer (EBL), an emitting layer (EML), a hole block layer (HBL), an electron transport layer (ETL) and an electron injection layer (EIL)

which are stacked. In an exemplary embodiment, hole injection layers of all the sub-pixels may be connected to each other to form a common layer, electron injection layers of all the sub-pixels may be connected to each other to form a common layer, hole transport layers of all the sub-pixels may be connected to each other to form a common layer, electron transport layers of all the sub-pixels may be connected to each other to form a common layer, hole block layers of all the sub-pixels may be connected to each other to form a common layer, emitting layers of adjacent sub-pixels may overlap with each other slightly or may isolate from each other, and electron block layers of adjacent sub-pixels may overlap with each other slightly or may isolate from each other.

In an exemplary example, the data reset circuit is activated when each row of sub-pixels is displayed, to set a voltage of a signal on a data signal line to a value of a voltage of a signal of the data initial signal terminal Vinit_Data, so as to ensure that a signal of the previous row will not be written when this row of sub-pixels is displayed.

The display substrate in accordance with the example of the present disclosure includes M rows and N columns of sub-pixels, N data signal lines and at least one data reset circuit, wherein at least one sub-pixel includes a pixel circuit; the i-th data signal line is connected to the i-th column of pixel circuits; the data reset circuit, electrically connected to the data reset control terminal, the data initial signal terminal and the N data signal lines, is configured to provide a signal of the data initial signal terminal to the N data signal lines under the control of the data reset control terminal. In the present disclosure, signals of the data signal lines can be reset by setting the data reset circuit, so as to ensure that the signal of the previous row will not be written to the pixel circuit when this row of sub-pixels is displayed, thereby guaranteeing normal writing of data signals and improving the display effect of the display substrate.

Figure 5:
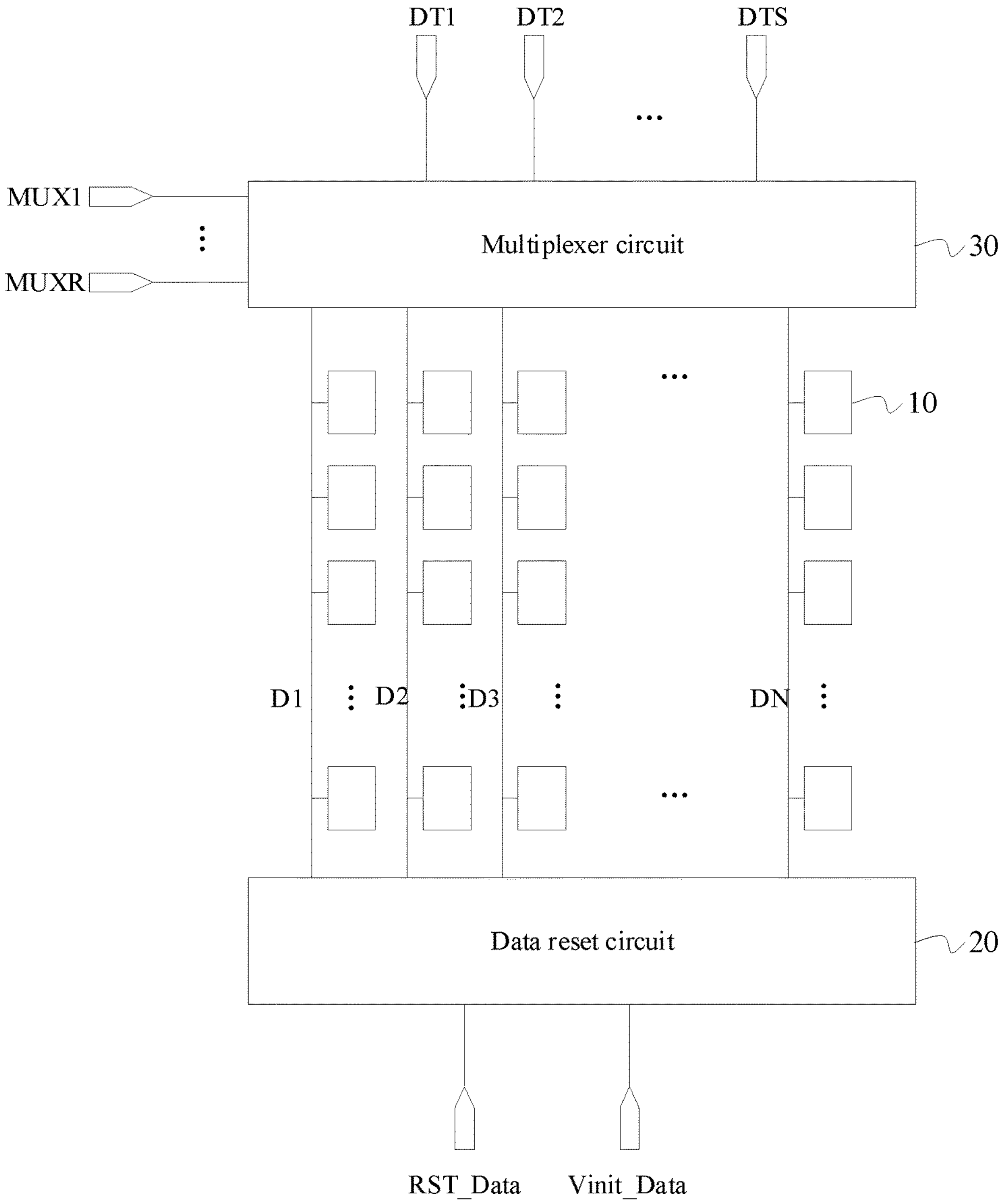
FIG. 5 is a schematic structure diagram of a display substrate in accordance with an exemplary example.

FIG. 5 is a schematic structure diagram of a display substrate in accordance with an exemplary example. As shown in FIG. 5, in an exemplary example, the display substrate may further include a multiplexer circuit 30. The multiplexer circuit 30, electrically connected to R multiplex control terminals MUX1 to MUXR, S data output terminals DT1 to DTS and the N data signal lines D1 to DN respectively, is configured to output signals of the S data output terminals DT1 to DTS to the N data signal lines D1 to DN in a way of time sharing under the control of the R multiplex control terminals MUX1 to MUXR, S=N/R and R is a positive integer greater than or equal to 2.

The multiplexer circuit in the present disclosure can reduce the border of the display substrate to implement seamless splicing of the display substrate.

Figure 6:
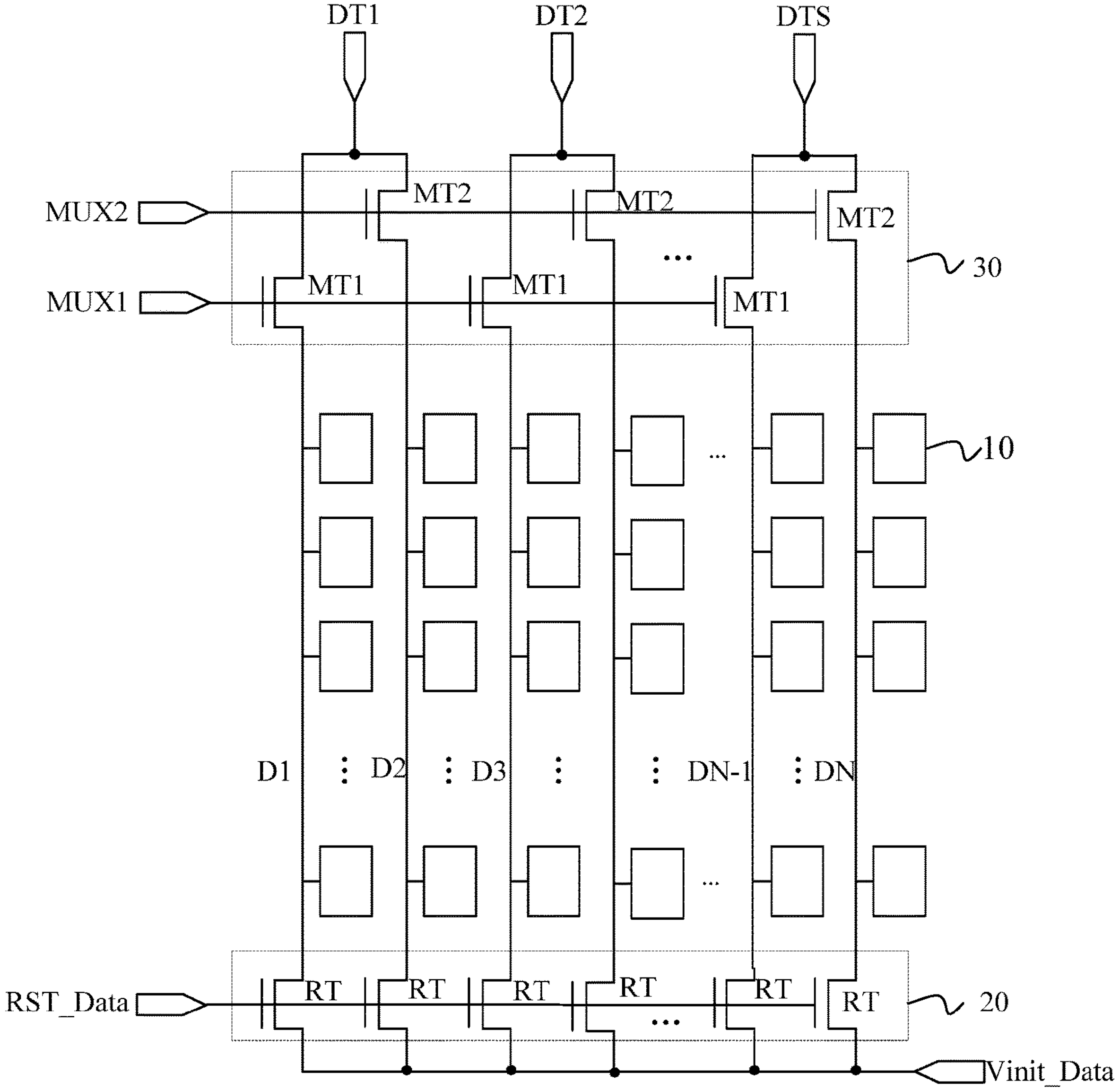
FIG. 6 is a schematic structure diagram of a display substrate in accordance with another exemplary example.

FIG. 6 is a schematic structure diagram of a display substrate in accordance with another exemplary example. As shown in FIG. 6, in an exemplary example, the data reset circuit 20 may include N data reset transistors RT.

A control electrode of the i-th data reset transistor RT is electrically connected to the data reset control terminal RST_Data, a first electrode of the i-th data reset transistor RT is electrically connected to the data initial signal terminal Vinit_Data, and a second electrode of the i-th data reset transistor RT is electrically connected to the i-th data signal line Di.

In an exemplary example, the data reset transistor RT may be a P-type transistor or an N-type transistor, the present disclosure is not limited thereto.

In an exemplary example, as shown in FIG. 6, when R=2, the two reset control terminals are a first reset control terminal MUX1 and a second reset control terminal MUX2 respectively, and the multiplexer circuit 30 may include S first multiplex transistors MT1 and S second multiplex transistors MT1, at which point S=N/2. R=2 in the multiplexer circuit is illustrated in FIG. 6 as an example.

In an exemplary example, a control electrode of the t-th first multiplex transistor is electrically connected to the first reset control terminal MUX1, a first electrode of the t-th first multiplex transistor is electrically connected to the (2t−1)-th data signal line, and a second electrode of the t-th first multiplex transistor is electrically connected to the t-th column of data output terminals, 1≤t≤S. Illustratively, the control electrode of the first one of the first multiplex transistors MT1 is electrically connected to the first reset control terminal MUX1, the first electrode of the first one of the first multiplex transistors MT1 is electrically connected to the first data signal line D1, and the second electrode of the first one of the first multiplex transistors MT1 is electrically connected to the first column of data output terminals DT1; the control electrode of the second one of the first multiplex transistors MT1 is electrically connected to the first reset control terminal MUX1, the first electrode of the second one of the first multiplex transistors MT1 is electrically connected to the third data signal line D3, and the second electrode of the second one of the first multiplex transistors MT1 is electrically connected to the second column of data output terminals DT2; and so on.

In an exemplary example, a control electrode of the t-th second multiplex transistor is electrically connected to the second reset control terminal, a first electrode of the t-th second multiplex transistor is electrically connected to the 2t-th data signal line, and a second electrode of the t-th second multiplex transistor is electrically connected to the t-th column of data output terminals. Illustratively, the control electrode of the first one of the second multiplex transistors MT2 is electrically connected to the second reset control terminal MUX2, the first electrode of the first one of the second multiplex transistors MT2 is electrically connected to the second data signal line D2, and the second electrode of the second one of the second multiplex transistors MT2 is electrically connected to the first column of data output terminals DT1; the control electrode of the second one of the second multiplex transistors MT2 is electrically connected to the second reset control terminal MUX2, the first electrode of the second one of the second multiplex transistors MT2 is electrically connected to the fourth data signal line D4, and the second electrode of the second one of the second multiplex transistors MT2 is electrically connected to the second column of data output terminals DT2; and so on.

In an exemplary example, the first multiplex transistors MT1 and the second multiplex transistors MT2 may be switching transistors. Both the first multiplex transistors MT1 and the second multiplex transistors MT2 may be P-type transistors or N-type transistors, or one of the first multiplex transistors MT1 and the second multiplex transistors MT2 are N-type transistors and the other are P-type transistors, the present disclosure is not limited thereto.

In an exemplary example, as shown in FIGS. 5 and 6, the data reset circuit 20 and the multiplexer circuit 30 are located at both sides of the N data signal lines respectively, and the data reset circuit 20 and the multiplexer circuit 30 are arranged along an extension direction of the data signal lines.

In an exemplary example, as shown in FIGS. 5 and 6, the data reset circuit is electrically connected to first ends of the N data signal lines, and the multiplexer circuit is electrically connected to second ends of the N data signal lines.

In an exemplary example, the display substrate includes a display area and a non-display area. The sub-pixels arranged in an array are located in the display area, and the data reset circuit and the multiplexer circuit are located in the non-display area. The display area includes a first side and a second side which are arranged oppositely. The data reset circuit is located in the first side of the display area, and the multiplexer circuit is located in the second side of the display area.

The data reset circuit in the present disclosure is located at one end of the N data signal lines, i.e., at the periphery of the array of sub-pixels, so as to prevent being influenced by the pixel circuit, avoid changes in display grayscale resulting from its coupling with the pixel circuit, and improve the display effect of the display substrate.

Figure 7:
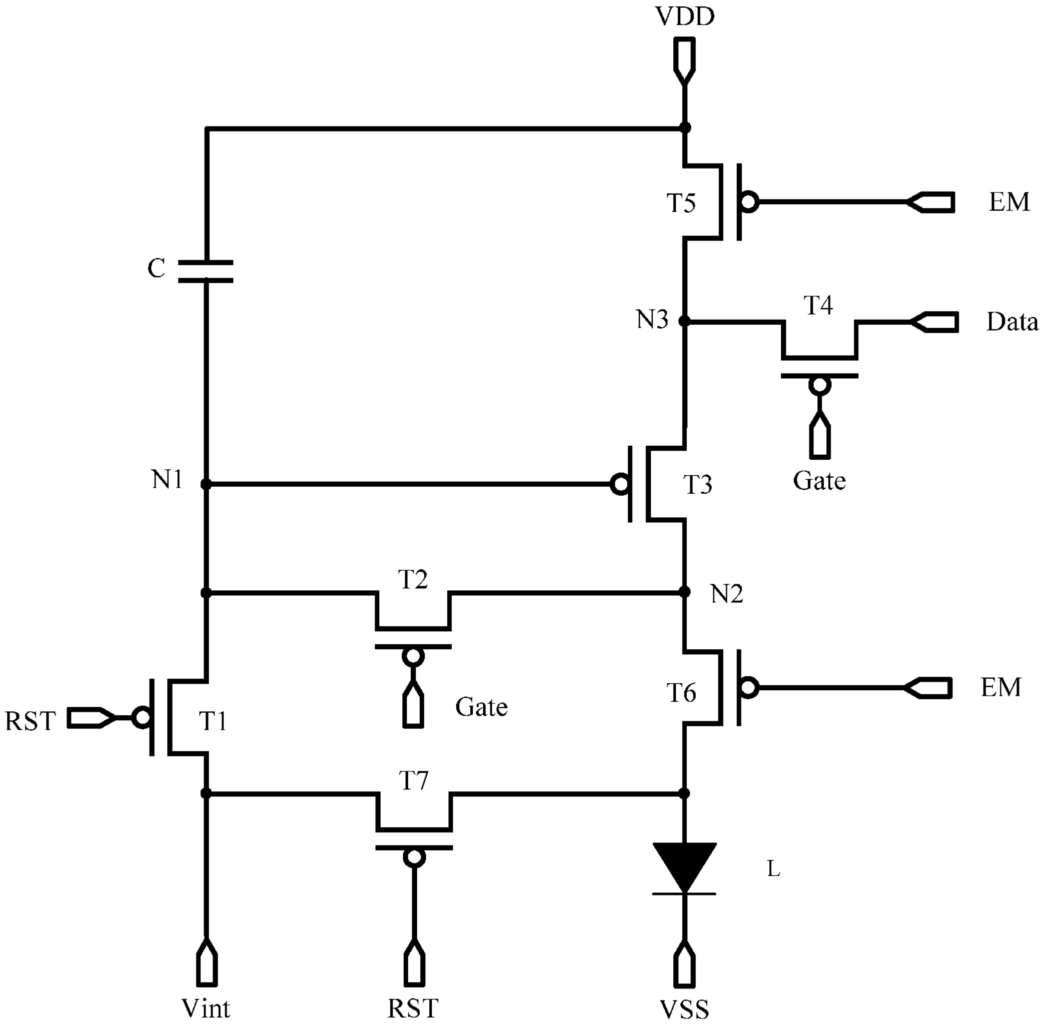
FIG. 7 is an equivalent circuit diagram of a pixel circuit.

FIG. 7 is an equivalent circuit diagram of a pixel circuit. As shown in FIG. 7, in an exemplary example, the pixel circuit may include a first transistor T1 to a seventh transistor T7 and a capacitor C.

As shown in FIG. 7, a control electrode of the first transistor T1 is connected to a reset signal terminal RST, a first electrode of the first transistor T1 is connected to an initial signal terminal Vinit, and a second electrode of the first transistor T1 is connected to a first node N1; a control electrode of the second transistor T2 is connected to a scan signal terminal Gate, a first electrode of the second transistor T2 is connected to the first node N1, and a second electrode of the second transistor T2 is connected to a second node N2; a control electrode of the third transistor T3 is connected to the first node N1, a first electrode of the third transistor T3 is connected to a third node N3, and a second electrode of the third transistor T3 is connected to the second node N2; a control electrode of the fourth transistor T4 is connected to the scan signal terminal, a first electrode of the fourth transistor T4 is connected to a data signal terminal Data, and a second electrode of the fourth transistor T4 is connected to the third node N3; a control electrode of the fifth transistor T5 is connected to a light emitting signal terminal EM, a first electrode of the fifth transistor T5 is connected to a first power supply terminal VDD, and a second electrode of the fifth transistor T5 is connected to the third node N3; a control electrode of the sixth transistor T6 is connected to the light emitting signal terminal EM, a first electrode of the sixth transistor T6 is connected to the second node N2, and a second electrode of the sixth transistor T6 is connected to a first electrode of the light emitting element L; a control electrode of the seventh transistor T7 is connected to the reset signal terminal, a first electrode of the seventh transistor T7 is connected to the initial signal terminal Vinit, and a second electrode of the seventh transistor is connected to the first electrode of the light emitting element L; a first terminal of the capacitor C is connected to the first power supply terminal VDD, and a second terminal of the capacitor C is connected to the first node N1.

In an exemplary example, the third transistor T3 may be a driving transistor. The third transistor T3 determines the amount of a drive current flowing between the first power supply line VDD and a second power supply line VSS according to a potential difference between its control electrode and first electrode.

In an exemplary example, the first transistor T1, the second transistor T2 and the fourth transistor T4 through the seventh transistor T7 may be switching transistors.

As shown in FIG. 7, the light emitting element L is connected to the pixel circuit and the second power supply terminal VSS respectively.

In an exemplary example, the first power supply terminal VDD continuously provides high-level signals, and the second power supply terminal VSS continuously provides low-level signals.

In an exemplary example, the first transistor T1 through the seventh transistor T7 in the pixel circuit may be the same type of transistors, for example, they may all be P-type transistors or N-type transistors, so as to simplify the process flow, reduce the process difficulty of the display substrate and improve the yield rate of products.

In an exemplary example, the first transistor T1 to the seventh transistor T7 may include P-type transistors and N-type transistors.

In an exemplary example, the j-th row of scan signal lines is electrically connected to the scan signal terminal of the j-th row of pixel circuits, the j-th reset signal line is electrically connected to the reset signal terminal of the j-th row of pixel circuits, the j-th light emitting signal line is connected to the light emitting signal terminal of the j-th row of pixel circuits, and the i-th data signal line is electrically connected to the data signal terminal of the i-th row of pixel circuits, $1 \leq j \leq M$.

In an exemplary example, pixel circuits located in the same row are connected to the same reset signal line, the same scan signal line, and the same light emitting signal line.

Figure 8:
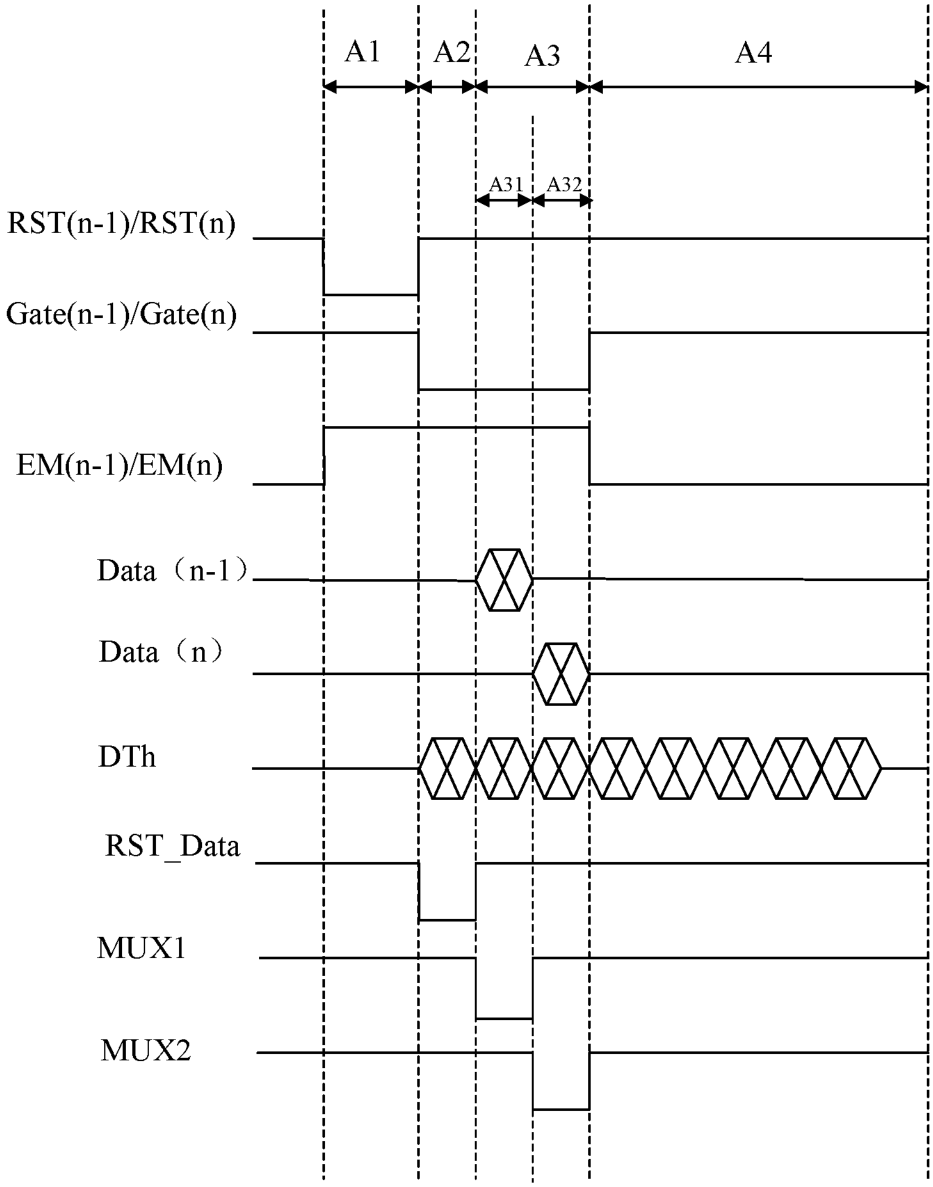
FIG. 8 is a work time sequence diagram of a display substrate in accordance with an exemplary example.
Figure 9:
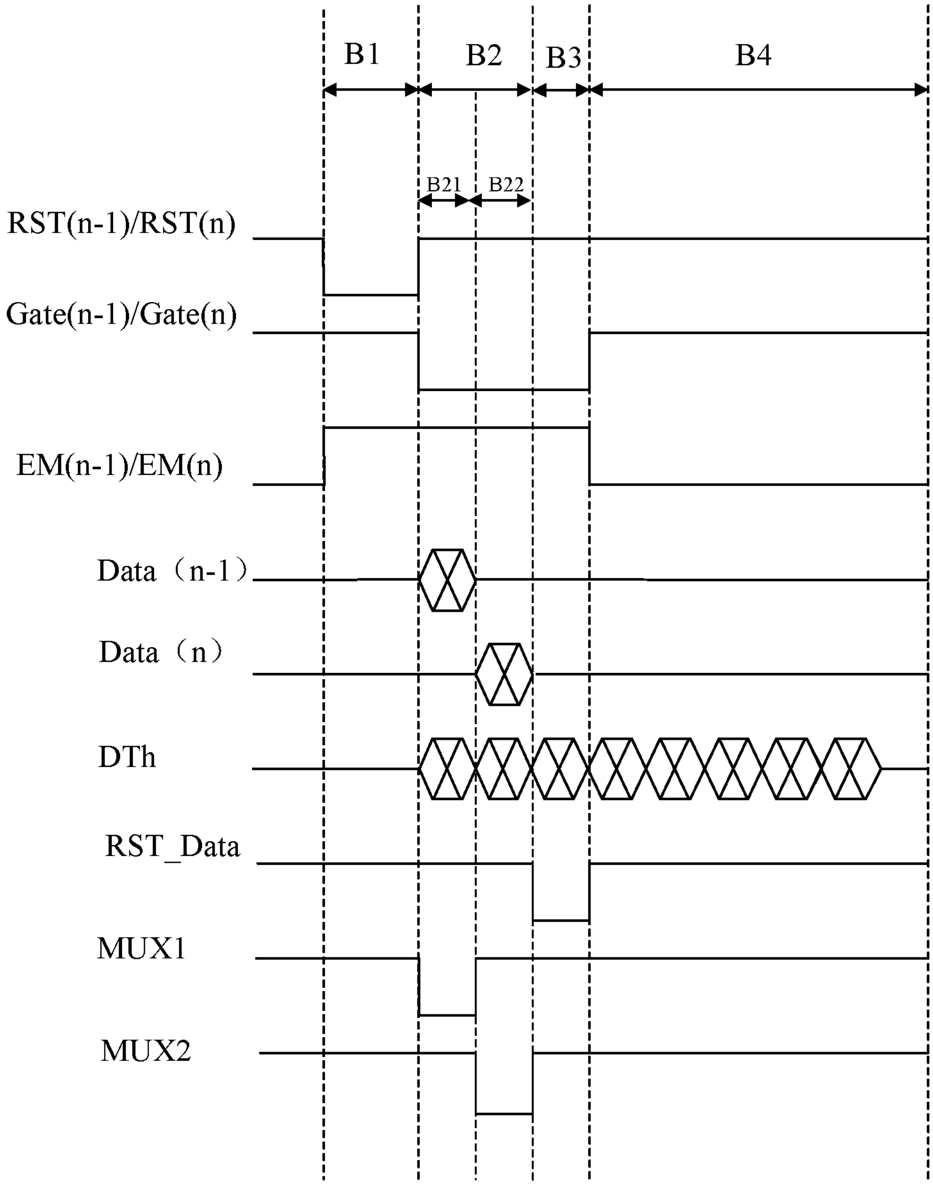
FIG. 9 is a work time sequence diagram of a display substrate in accordance with another exemplary example.
Figure 10:
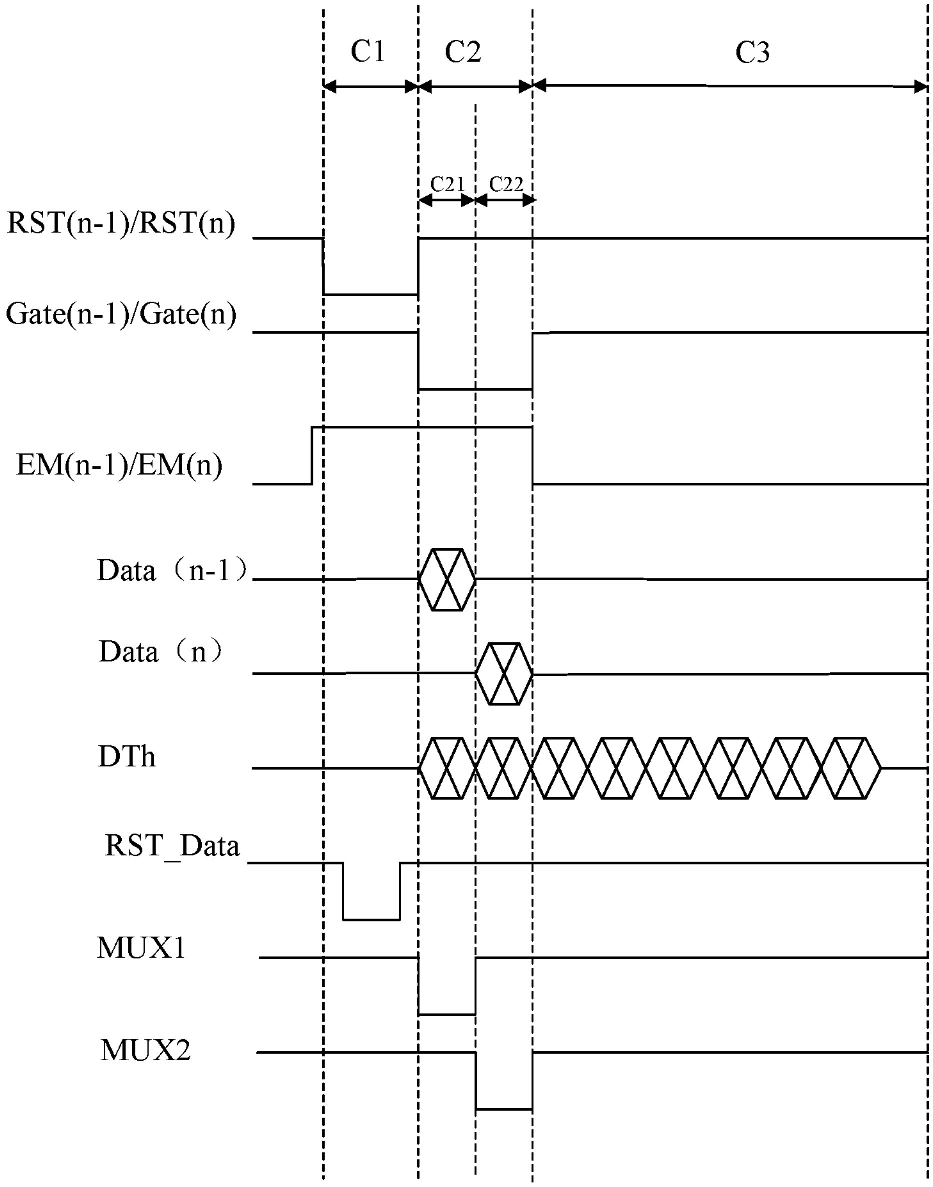
FIG. 10 is a work time sequence diagram of a display substrate in accordance with a further exemplary example.
Figure 11:
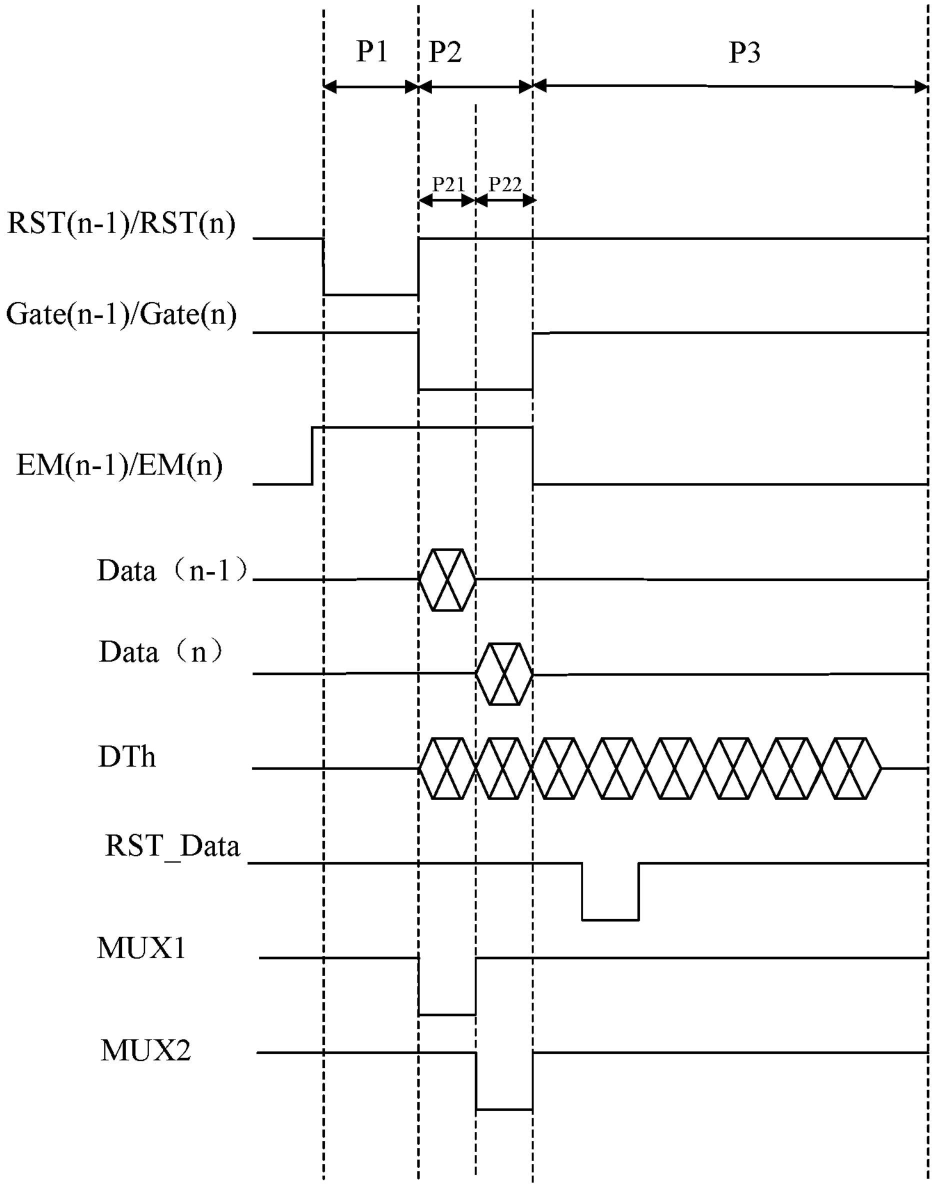
FIG. 11 is a work time sequence diagram of a display substrate in accordance with still another exemplary example.

FIG. 8 is a work time sequence diagram of a display substrate in accordance with an exemplary example, FIG. 9 is a work time sequence diagram of a display substrate in accordance with another exemplary example, FIG. 10 is a work time sequence diagram of a display substrate in accordance with a further exemplary example, and FIG. 11 is a work time sequence diagram of a display substrate in accordance with still another exemplary example. R=2, and the data reset transistor, the first multiplex transistor, the second multiplex transistor and the first to seventh transistors being P-type transistors are illustrated in FIGS. 8 to 11 as an example. As shown in FIGS. 8 to 11, RST (n−1) is a reset signal terminal of a pixel circuit in the m-th row and the (n−1)-th column, RST (n) is a reset signal terminal of a pixel circuit in the m-th row and the n-th column, Gate (n−1) is a scan signal terminal of the pixel circuit in the m-th row and the (n−1)-th column, Gate (n) is a scan signal terminal of the pixel circuit in the m-th row and the n-th column, EM (n−1) is a light emitting signal terminal of the pixel circuit in the m-th row and the (n−1)-th column, EM (n) is a light signal terminal of the pixel circuit in the m-th row and the n-th column, Data (n−1) is a data signal terminal of the pixel circuit in the m-th row and the (n−1)-th column, Data (n) is a data signal terminal of the pixel circuit in the m-th row and the n-th column, and DTh is a data output terminal of the (n−1)-th data signal line connected to the n-th data signal line. The (n−1)-th data signal line is electrically connected to the first multiplex transistor, and the n-th data signal line is electrically connected to the second multiplex transistor.

In an exemplary example, as shown in FIGS. 8 to 11, for at least one pixel circuit, cut-off time before which the reset signal terminal RST receives active level signals is not later than start time at which the scan signal terminal Gate receives the active level signals, and cut-off time before which the scan signal terminal Gate receives the active level signals is not later than start time at which the light emitting signal terminal EM receives the active level signals.

In an exemplary example, as shown in FIGS. 8 to 11, time at which the R multiplex control terminals receive the active level signals is within time at which the scan signal terminal Gate receives the active level signals, and there is no overlap among times at which different multiplex control terminals receive the active level signals. Cut-off time before which the x-th multiplex control terminal receives the active level signals is not later than start time at which the (x+1)-th multiplex control terminal receives the active level signals, $1 \le x \le R-1$.

In an exemplary example, as shown in FIGS. 8 and 9, time at which the data reset control terminal receives the active level signals does not overlap with the time at which the R multiplex control terminals receive the active level signals.

In an exemplary example, as shown in FIGS. 8 and 9, the time at which the data reset control terminal RST_Data receives the active level signals is within the time at which the scan signal terminal Gate receives the active level signals.

In an exemplary example, cut-off time before which the data reset control terminal RST_Data receives the active level signals is not later than start time at which the first multiplex control terminal MUX1 receives the active level signals, or start time at which the data reset control terminal RST_Data receives the active level signals is later than cut-off time before which the R-th multiplex control terminal MUXR receives the active level signals. The cut-off time before which the data reset control terminal RST_Data receives the active level signals being not later than the start time at which the first multiplex control terminal MUX1 receives the active level signals is illustrated in FIG. 8 as an example, and the start time at which the data reset control terminal RST_Data receives the active level signals being later than the cut-off time before which the R-th multiplex control terminal MUXR receives the active level signals is illustrated in FIG. 9 as an example.

In an exemplary example, as shown in FIG. 10, the time at which the data reset control terminal RST_Data receives the active level signals is within time at which the reset signal terminal RST receives the active level signals.

In an exemplary example, as shown in FIG. 11, the time at which the data reset control terminal RST_Data receives the active level signals is within time at which the light emitting signal terminal EM receives the active level signals.

In an exemplary example, a duration during which the data reset control terminal RST_Data receives the active level signals is greater than or equal to a duration during which the multiplex control terminal receives the active level signals.

In an exemplary example, the initial signal terminal Vinit and the data initial signal terminal Vinit_Data are connected to the same signal line. The initial signal terminal and the data initial signal terminal are connected to the same signal line, so as to reduce the signal lines of the display substrate and implement the narrow border of the display substrate.

A working process of the display substrate in accordance with an exemplary example will be described below in conjunction with FIGS. 6, 7 and 8. The working process of the display substrate in accordance with the exemplary example may include the following stages.

In a first stage A1, which may be referred to as a reset stage, a signal of the reset signal terminal RST (n−1)/RST (n) is a low-level signal, and signals of the scan signal terminal Gate (n−1)/Gate (n), the light emitting signal terminal EM (n−1)/EM (n), the first multiplex control terminal Mux1, the second multiplex control terminal Mux2 and the data reset control terminal RST_Data are high-level signals. The signal of the reset signal terminal RST (n−1)/RST (n) is a low-level signal, such that the first transistor T1 and the seventh transistor T7 in each of the pixel circuits in the m-th row and the (n−1)-th column and in the m-th row and the n-th column are turned on, an initial signal of the initial signal terminal Vint is provided to the first node N1 and the first electrode of the light emitting element L to initialize the first node N1 and the first electrode of the light emitting element L, and the initial signal of the initial signal terminal Vint is provided to the first electrode of the light emitting element to ensure that the light emitting element does not emit light. The signals of the scan signal terminal Gate (n−1)/Gate (n) and the light emitting signal terminal EM (n−1)/EM (n) are high-level signals, such that the second transistor T2, the fourth transistor T4, the fifth transistor T5 and the sixth transistor T6 in each of the pixel circuits in the m-th row and the (n−1)-th column and in the m-th row and the n-th column are turned off. The signals of the first multiplex control terminal Mux1 and the second multiplex control terminal Mux2 are high-level signals, such that the first multiplex transistor MT1 and the second multiplex transistor MT2 in the multiplexer circuit are turned off. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

In a second stage A2, which may be referred to as a second reset stage, the signals of the scan signal terminal Gate (n−1)/Gate (n) and the data reset control terminal RST_Data are low-level signals, and the signals of the reset signal terminal RST (n−1)/RST (n), the light emitting signal terminal EM (n−1)/EM (n), the first multiplex control terminal Mux1 and the second multiplex control terminal Mux2 are high-level signals. The signal of the data reset control terminal RST_Data is a low-level signal, such that the data reset transistor RT in the data reset circuit is turned on, and the signal of the data initial signal terminal is written to the (n−1)-th and n-th data signal lines to reset signals of the (n−1)-th and n-th data signal lines, at which point the signals of both the data signal terminal Data (n−1) of the pixel circuit in the m-th row and the (n−1)-th column and the data signal terminal Data (n) of the pixel circuit in the m-th row and the n-th column are the signal of the data initial signal terminal. The signal of the reset signal terminal RST (n−1)/RST (n) is a high-level signal, such that the first transistor T1 and the seventh transistor T7 in each of the pixel circuits in the m-th row and the (n−1)-th column and in the m-th row and the n-th column are turned off, at which point the signal of the first node N1 remains to be the signal of the initial signal terminal. The signal of the scan signal terminal Gate (n−1)/Gate (n) is a low-level signal, such that the second transistor T2 and the fourth transistor T4 in each of the pixel circuits in the m-th row and the (n−1)-th column and in the m-th row and the n-th column are turned on, such that the signal of the data initial signal terminal is written to the third node N3. Since a difference between a voltage value of the third node N3 and a voltage value of the first node N1 is less than the threshold voltage Vth of the third transistor, the third transistor T3 is turned off. The signal of the light emitting signal terminal EM (n−1)/EM (n) is a high-level signal, such that the fifth transistor T5 and the sixth transistor T6 in each of the pixel circuits in the m-th row and the (n−1)-th column and in the m-th row and the n-th column are turned off. The signals of the first multiplex control terminal Mux1 and the second multiplex control terminal Mux2 are high-level signals, such that the first multiplex transistor MT1 and the second multiplex transistor MT2 in the multiplexer circuit are turned off. In this stage, the light emitting element L driven by each of the pixel circuits in the m-th row and the (n−1)-th column and in the m-th row and the n-th column does not emit light.

A third stage A3, which may be referred to as a data writing stage, may include a first sub-stage A31 and a second sub-stage A32.

In the first sub-stage A31, the signals of the scan signal terminal Gate (n−1)/Gate (n) and the first multiplex control terminal MUX1 are low-level signals, and the signals of the reset signal terminal RST (n−1)/RST (n), the light emitting signal terminal EM (n−1)/EM (n), the second multiplex control terminal MUX2 and the data reset control terminal RST_Data are high-level signals. Since the signals of the reset signal terminal RST (n−1)/RST (n) and the light emitting signal terminal EM (n−1)/EM (n) are high-level signals, the first transistor T1, the seventh transistor T7, the fifth transistor T5 and the sixth transistor T6 in each of the pixel circuits in the m-th row and the (n−1)-th column and in the m-th row and the n-th column are all turned off. The signal of the scan signal terminal Gate (n−1)/Gate (n) is a low-level signal, such that the second transistor T2 and the fourth transistor T4 in each of the pixel circuits in the m-th row and the (n−1)-th column and in the m-th row and the n-th column are turned on. The signal of the first multiplex control terminal MUX1 is a low-level signal, the first multiplex transistor MT1 is turned on, and the signal of the data output terminal DTh is written to the data signal terminal Data (n−1) of the pixel circuit in the m-th row and the (n−1)-th column through the (n−1)-th data signal line. For the pixel circuit in the m-th row and the (n−1)-th column, since the second transistor T2 and the fourth transistor T4 are turned on, a data signal of the data signal terminal Data (n−1) is written to the third node N3. Since a voltage difference between the third node N3 and the first node N1 is greater than the threshold voltage Vth of the third transistor, the third transistor T3 is turned on, and the signal of the third node N3 is written to the first node N1 through the turned-on third transistor T3 and second transistor T2 until the voltage value of the first node N1 equals to the sum of a data voltage of the data signal terminal Data (n−1) and the threshold voltage of the third transistor T3, i.e., the voltage value of the first node N1 satisfies Vd1+Vth, wherein Vd1 is the data voltage of the data signal terminal Data (n−1), at which point the third transistor T3 is turned off. The signal of the second multiplex control terminal MUX2 is a high-level signal, the second multiplex transistor MT2 is turned off, and the signal of the data output terminal DTh cannot be written to the data signal terminal Data (n) of the pixel circuit in the m-th row and the n-th column through the n-th data signal line. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

In the second sub-stage A32, the signals of the scan signal terminal Gate (n−1)/Gate (n) and the second multiplex control terminal MUX2 are low-level signals, and the signals of the reset signal terminal RST (n−1)/RST (n), the light emitting signal terminal EM (n−1)/EM (n), the first multiplex control terminal MUX1 and the data reset control terminal RST_Data are high-level signals. Since the signals of the reset signal terminal RST (n−1)/RST (n) and the light emitting signal terminal EM (n−1)/EM (n) are high-level signals, the first transistor T1, the seventh transistor T7, the fifth transistor T5 and the sixth transistor T6 in each of the pixel circuits in the m-th row and the (n−1)-th column and in the m-th row and the n-th column are all turned off. The signal of the scan signal terminal Gate (n−1)/Gate (n) is a low-level signal, and the second transistor T2 and the fourth transistor T4 in each of the pixel circuits in the m-th row and the (n−1)-th column and in the m-th row and the n-th column are turned on. The signal of the second multiplex control terminal MUX2 is a low-level signal, the second multiplex transistor MT2 is turned on, and the signal of the data output terminal DTh is written to the data signal terminal Data (n) of the pixel circuit in the m-th row and the n-th column through the n-th data signal line. For the pixel circuit in the m-th row and the n-th column, because the second transistor T2 and the fourth transistor T4 are turned on, a data signal of the data signal terminal Data (n) is written to the third node N3. Because the voltage difference between the third node N3 and the first node N1 is greater than the threshold voltage Vth of the third transistor, the third transistor T3 is turned on, and the signal of the third node N3 is written to the first node N1 through the turned-on third transistor T3 and second transistor T2 until the voltage value of the first node N1 equals to the sum of the data voltage of the data signal terminal Data (n−1) and the threshold voltage of the third transistor T3, i.e., the voltage value of the first node N1 satisfies Vd2+Vth, wherein Vd2 is the data voltage of the data signal terminal Data (n), at which point the third transistor T3 is turned off. The signal of the first multiplex control terminal MUX1 is a high-level signal, the first multiplex transistor MT1 is turned off, and the signal of the data output terminal DTh cannot be written to the data signal terminal Data (n−1) of the pixel circuit in the m-th row and the (n−1)-th column through the (n−1)-th data signal line. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

In a fourth stage A4, which may be referred to as a light emitting stage, the signals of the reset signal terminal RST (n−1)/RST (n), the scan signal terminal Gate (n−1)/Gate (n), the first multiplex control terminal MUX1, the second multiplex control terminal MUX2 and the data reset control terminal RST_Data are high-level signals, and the signals of the light emitting signal terminal EM (n−1)/EM (n) are low-level signals. The signals of the reset signal terminal RST (n−1)/RST (n) and the scan signal terminal Gate (n−1)/Gate (n) are high-level signals, such that the first transistor T1, the second transistor T2, the fourth transistor T4 and the seventh transistor T7 in each of the pixel circuits in the m-th row and the (n−1)-th column and in the m-th row and the n-th column are turned off. The signals of the first multiplex control terminal MUX1 and the second multiplex control terminal MUX2 are high-level signals, such that both the first multiplex transistor MT1 and the second multiplex transistor MT2 in the multiplexer circuit 30 are turned off. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light. The signal of the light emitting signal terminal EM (n−1)/EM (n) is a low-level signal, such that the fifth transistor T5 and the sixth transistor T6 in each of the pixel circuits in the m-th row and the (n−1)-th column and in the m-th row and the n-th column are turned on, a voltage signal of the first power supply terminal VDD is written to the third node N3 through the fifth transistor T5, the first node N1 maintains the voltage from the previous stage, and the third transistor T3 is turned on. The power output from the first power supply terminal VDD provides a drive current to the first electrode of the light emitting element L through the turned-on fifth transistor T5, third transistor T3 and sixth transistor T6 to drive the light emitting element L to emit light.

In the driving process of the pixel circuit in the m-th row and the (n−1)-th column, a drive current flowing through the third transistor T3 (driving transistor) is determined by a voltage difference between its control electrode and first electrode. Therefore, the drive current of the third transistor T3 is:

$$I=K^*(Vgs-Vth)^2=K^*[(Vdd-Vd1+|Vth|)-Vth]^2=K^*[(Vdd-Vd1]^2,$$

wherein I is the drive current flowing through the third transistor T3, that is, the drive current driving the light emitting element, K is a constant, Vgs is the voltage difference between the control electrode and the first electrode of the third transistor T3, Vd1 is the data voltage of the data signal terminal Data (n−1), and Vdd is a supply voltage output from the first power supply line VDD.

In the driving process of the pixel circuit in the m-th row and the n-th column, a drive current flowing through the third transistor T3 (driving transistor) is determined by a voltage difference between its gate electrode and first electrode. Therefore, the drive current of the third transistor T3 is:

$$I=K^*(Vgs-Vth)^2=K^*[(Vdd-Vd2+|Vth|)-Vth]^2=K^*[(Vdd-Vd2]^2,$$

wherein I is the drive current flowing through the third transistor T3, that is, the drive current driving the light emitting element, K is a constant, Vgs is the voltage difference between the control electrode and the first electrode of the third transistor T3, Vd2 is a data voltage of the data signal terminal Data (n), and Vdd is the supply voltage output from the first power supply line VDD.

In the process of the display substrate of the present disclosure, the signals of the (n−1)-th and n-th data signal lines are reset in the second stage, so that when the signals of the Gate (n−1) and Gate (n) are active level signals, the data signal provided from the (n−1)-th data signal line to the data signal terminal of the pixel circuit in the (m−1)-th row and the (n−1)-th column can be prevented from being written to the pixel circuit in the m-th row and the (n−1)-th column, and the data signal provided from the n-th data signal line to the data signal terminal of the pixel circuit in the (m−1)-th row and the n-th column can be prevented from being written to the pixel circuit in the m-th row and the n-th column, thereby avoiding the situation where the low-level signal provided from the n-th data signal line to the data signal terminal of the pixel circuit in the m-th row and the n-th column cannot be written to the pixel circuit in the m-th row and the n-th column when the high-level signal is provided from the n-th data signal line to the data signal terminal of the pixel circuit in the (m−1)-th row and the n-th column and the low-level signal is provided from the n-th data signal line to the data signal terminal of the pixel circuit in the m-th row and the n-th column, thereby improving the display effect of the display substrate.

A working process of the display substrate in accordance with an exemplary example will be described below in conjunction with FIGS. 6, 7 and 9. The working process of the display substrate in accordance with the exemplary example may include the following stages.

In a first stage B1, which may be referred to as a first reset stage, the signal of the reset signal terminal RST (n−1)/RST (n) is a low-level signal, and the signals of the scan signal terminal Gate (n−1)/Gate (n), the light emitting signal terminal EM (n−1)/EM (n), the first multiplex control terminal Mux1, the second multiplex control terminal Mux2 and the data reset control terminal RST_Data are high-level signals. The signal of the reset signal terminal RST (n−1)/RST (n) is a low-level signal, such that the first transistor T1 and the seventh transistor T7 in each of the pixel circuits in the m-th row and the (n−1)-th column and in the m-th row and the n-th column are turned on, the initial signal of the initial signal terminal Vint is provided to the first node N1 and the first electrode of the light emitting element L to initialize the first node N1 and the first electrode of the light emitting element L, and the initial signal of the initial signal terminal Vint is provided to the first electrode of the light emitting element to ensure that the light emitting element does not emit light. The signals of the scan signal terminal Gate (n−1)/Gate (n) and the light emitting signal terminal EM (n−1)/EM (n) are high-level signals, such that the second transistor T2, the fourth transistor T4, the fifth transistor T5 and the sixth transistor T6 in each of the pixel circuits in the m-th row and the (n−1)-th column and in the m-th row and the n-th column are turned off. The signals of the first multiplex control terminal Mux1 and the second multiplex control terminal Mux2 are high-level signals, such that the first multiplex transistor MT1 and the second multiplex transistor MT2 in the multiplexer circuit are turned off. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

A second stage B2, which may be referred to as a data writing stage, may include a first sub-stage B21 and a second sub-stage B22.

In the first sub-stage B21, the signals of the scan signal terminal Gate (n−1)/Gate (n) and the first multiplex control terminal MUX1 are low-level signals, and the signals of the reset signal terminal RST (n−1)/RST (n), the light emitting signal terminal EM (n−1)/EM (n), the second multiplex control terminal MUX2 and the data reset control terminal RST_Data are high-level signals. Since the signals of the reset signal terminal RST (n−1)/RST (n) and the light emitting signal terminal EM (n−1)/EM (n) are high-level signals, the first transistor T1, the seventh transistor T7, the fifth transistor T5 and the sixth transistor T6 in each of the pixel circuits in the m-th row and the (n−1)-th column and in the m-th row and the n-th column are all turned off. The signal of the scan signal terminal Gate (n−1)/Gate (n) is a low-level signal, such that the second transistor T2 and the fourth transistor T4 in each of the pixel circuits in the m-th row and the (n−1)-th column and in the m-th row and the n-th column are turned on. The signal of the first multiplex control terminal MUX1 is a low-level signal, the first multiplex transistor MT1 is turned on, and the signal of the data output terminal DTh is written to the data signal terminal Data (n−1) of the pixel circuit in the m-th row and the (n−1)-th column through the (n−1)-th data signal line. For the pixel circuit in the m-th row and the (n−1)-th column, because the second transistor T2 and the fourth transistor T4 are turned on, the data signal of the data signal terminal Data (n−1) is written to the third node N3. Because the voltage difference between the third node N3 and the first node N1 is greater than the threshold voltage Vth of the third transistor, the third transistor T3 is turned on, and the signal of the third node N3 is written to the first node N1 through the turned-on third transistor T3 and second transistor T2 until the voltage value of the first node N1 equals to the sum of the data voltage of the data signal terminal Data (n−1) and the threshold voltage of the third transistor T3, i.e., the voltage value of the first node N1 satisfies Vd1+Vth, wherein Vd1 is the data voltage of the data signal terminal Data (n−1), at which point the third transistor T3 is turned off. The signal of the second multiplex control terminal MUX2 is a high-level signal, the second multiplex transistor MT2 is turned off, and the signal of the data output terminal DTh cannot be written to the data signal terminal Data (n) of the pixel circuit in the m-th row and the n-th column through the n-th data signal line. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

In the second substage B22, the signals of the scan signal terminal Gate (n−1)/Gate (n) and the second multiplex control terminal MUX2 are low-level signals, and the signals of the reset signal terminal RST (n−1)/RST (n), the light emitting signal terminal EM (n−1)/EM (n), the first multiplex control terminal MUX1 and the data reset control terminal RST_Data are high-level signals. Since the signals of the reset signal terminal RST (n−1)/RST (n) and the light emitting signal terminal EM (n−1)/EM (n) are high-level signals, the first transistor T1, the seventh transistor T7, the fifth transistor T5 and the sixth transistor T6 in each of the pixel circuits in the m-th row and the (n−1)-th column and in the m-th row and the n-th column are all turned off. The signal of the scan signal terminal Gate (n−1)/Gate (n) is a low-level signal, such that the second transistor T2 and the fourth transistor T4 in each of the pixel circuits in the m-th row and the (n−1)-th column and in the m-th row and the n-th column are turned on. The signal of the second multiplex control terminal MUX2 is a low-level signal, the second multiplex transistor MT2 is turned on, and the signal of the data output terminal DTh is written to the data signal terminal Data (n) of the pixel circuit in the m-th row and the n-th column through the n-th data signal line. For the pixel circuit in the m-th row and the n-th column, since the second transistor T2 and the fourth transistor T4 are turned on, the data signal of the data signal terminal Data (n) is written to the third node N3. Since the voltage difference between the third node N3 and the first node N1 is greater than the threshold voltage Vth of the third transistor, the third transistor T3 is turned on, and the signal of the third node N3 is written to the first node N1 through the turned-on third transistor T3 and second transistor T2 until the voltage value of the first node N1 equals to the sum of the data voltage of the data signal terminal Data (n−1) and the threshold voltage of the third transistor T3, i.e., the voltage value of the first node N1 satisfies Vd2+Vth, wherein Vd2 is the data voltage of the data signal terminal Data (n), at which point the third transistor T3 is turned off. The signal of the first multiplex control terminal MUX1 is a high-level signal, the first multiplex transistor MT1 is turned off, and the signal of the data output terminal DTh cannot be written to the data signal terminal Data (n−1) of the pixel circuit in the m-th row and the (n−1)-th column through the (n−1)-th data signal line. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

In a third stage B3, which may be referred to as a second reset stage, the signals of the scan signal terminal Gate (n−1)/Gate (n) and the data reset control terminal RST_Data are low-level signals, and the signals of the reset signal terminal RST (n−1)/RST (n), the light emitting signal terminal EM (n−1)/EM (n), the first multiplex control terminal Mux1 and the second multiplex control terminal Mux2 are high-level signals. The signal of the data reset control terminal RST_Data is a low-level signal, such that the data reset transistor RT in the data reset circuit is turned on, and the signal of the data initial signal terminal is written to the (n−1)-th and n-th data signal lines to reset the signals of the (n−1)-th and n-th data signal lines, at which point the signals of both the data signal terminal Data (n−1) of the pixel circuit in the m-th row and the (n−1)-th column and the data signal terminal Data (n) of the pixel circuit in the m-th row and the n-th column are the signal of the data initial signal terminal. The signal of the reset signal terminal RST (n−1)/RST (n) is a high-level signal, such that the first transistor T1 and the seventh transistor T7 in each of the pixel circuits in the m-th row and the (n−1)-th column and in the m-th row and the n-th column are turned off, at which point the first node N1 maintains the voltage from the previous stage. The signal of the scan signal terminal Gate (n−1)/Gate (n) is a low-level signal, such that the second transistor T2 and the fourth transistor T4 in each of the pixel circuits in the m-th row and the (n−1)-th column and in the m-th row and the n-th column are turned on, such that the signal of the data initial signal terminal is written to the third node N3. Since the difference between the voltage value of the third node N3 and the voltage value of the first node N1 is less than the threshold voltage Vth of the third transistor, the third transistor T3 is turned off. The signal of the light emitting signal terminal EM (n−1)/EM (n) is a high-level signal, such that the fifth transistor T5 and the sixth transistor T6 in each of the pixel circuits in the m-th row and the (n−1)-th column and in the m-th row and the n-th column are turned off. The signals of the first multiplex control terminal Mux1 and the second multiplex control terminal Mux2 are high-level signals, such that the first multiplex transistor MT1 and the second multiplex transistor MT2 in the multiplexer circuit are turned off. In this stage, the light emitting element L driven by each of the pixel circuits in the m-th row and the (n−1)-th column and in the m-th row and the n-th column does not emit light.

In a fourth stage B4, which may be referred to as a light emitting stage, the signals of the reset signal terminal RST (n−1)/RST (n), the scan signal terminal Gate (n−1)/Gate (n), the first multiplex control terminal MUX1, the second multiplex control terminal MUX2 and the data reset control terminal RST_Data are high-level signals, and the signal of the light emitting signal terminal EM (n−1)/EM (n) is a low-level signal. The signals of the reset signal terminal RST (n−1)/RST (n) and the scan signal terminal Gate (n−1)/Gate (n) are high-level signals, such that the first transistor T1, the second transistor T2, the fourth transistor T4 and the seventh transistor T7 in each of the pixel circuits in the m-th row and the (n−1)-th column and in the m-th row and the n-th column are turned off. The signals of the first multiplex control terminal MUX1 and the second multiplex control terminal MUX2 are high-level signals, such that both the first multiplex transistor MT1 and the second multiplex transistor MT2 in the multiplexer circuit 30 are turned off. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light. The signal of the light emitting signal terminal EM (n−1)/EM (n) is a low-level signal, such that the fifth transistor T5 and the sixth transistor T6 in each of the pixel circuits in the m-th row and the (n−1)-th column and in the m-th row and the n-th column are turned on, the voltage signal of the first power supply terminal VDD is written to the third node N3 through the fifth transistor T5, the first node N1 maintains the voltage from the previous stage, and the third transistor T3 is turned on. The power output from the first power supply terminal VDD provides a drive circuit to the first electrode of the light emitting element L through the turned-on fifth transistor T5, third transistor T3 and sixth transistor T6 to drive the light emitting element L to emit light.

In the driving process of the pixel circuit in the m-th row and the (n−1)-th column, the drive current flowing through the third transistor T3 (driving transistor) is determined by the voltage difference between its control electrode and first electrode. Therefore, the drive current of the third transistor T3 is:

$$I=K*(Vgs-Vth)^2=K*[(Vdd-Vd1+|Vth|)-Vth]^2=K*[(Vdd-Vd1]^2,$$

wherein I is the drive current flowing through the third transistor T3, that is, the drive current driving the light emitting element, K is a constant, Vgs is the voltage difference between the control electrode and the first electrode of the third transistor T3, Vd1 is the data voltage of the data signal terminal Data (n−1), and Vdd is the supply voltage output from the first power supply line VDD.

In the driving process of the pixel circuit in the m-th row and the n-th column, the drive current flowing through the third transistor T3 (driving transistor) is determined by the voltage difference between its gate electrode and first electrode. Therefore, the drive current of the third transistor T3 is:

$$I=K*(Vgs-Vth)^2=K*[(Vdd-Vd2+|Vth|)-Vth]^2=K*[(Vdd-Vd2]^2,$$

wherein I is the drive current flowing through the third transistor T3, that is, the drive current driving the light emitting element, K is a constant, Vgs is the voltage difference between the control electrode and the first electrode of the third transistor T3, Vd2 is the data voltage of the data signal terminal Data (n), and Vdd is the supply voltage output from the first power supply line VDD.

In the process of the display substrate of the present disclosure, after the data signals are written to in the pixel circuits in the m-th row and the (n−1)-th column and in the m-th row and the n-th column and before the pixel circuits in the (m+1)-th row are displayed, the signals of the (n−1)-th and n-th data signal lines are reset, at which point the signals of the data signal terminal of the pixel circuit in the (m+1)-th row and the (n−1)-th column and the data signal terminal of the pixel circuit in the (m+1)-th row and the n-th column are the signal of the data initial signal terminal, so that when the pixel circuits in the (m+1)-th row are displayed, the data signal provided from the (n−1)-th data signal line to the data signal terminal of the pixel circuit in the m-th row and the (n−1)-th column can be prevented from being written to the pixel circuit in the (m+1)-th row and the (n−1)-th column, and the data signal provided from the n-th data signal line to the data signal terminal of the pixel circuit in the m-th row and the n-th column can be prevented from being written to the pixel circuit in the (m+1)-th row and the n-th column, thereby avoiding the situation where the low-level signal provided from the n-th data signal line to the data signal terminal of the pixel circuit in the m-th row and the n-th column cannot be written to the pixel circuit in the m-th row and the n-th column when the high-level signal is provided from the n-th data signal line to the data signal terminal of the pixel circuit in the (m−1)-th row and the n-th column and the low-level signal is provided from the n-th data signal line to the data signal terminal of the pixel circuit in the m-th row and the n-th column, thereby improving the display effect of the display substrate.

A working process of the display substrate in accordance with an exemplary example will be described below in conjunction with FIGS. 6, 7 and 10. The working process of the display substrate in accordance with the exemplary example may include the following stages.

In a first stage C1, which may be referred to as a reset stage, the signals of the reset signal terminal RST (n−1)/RST (n) and the data reset control terminal RST_Data are low-level signals, and the signals of the scan signal terminal Gate (n−1)/Gate (n), the light emitting signal terminal EM (n−1)/EM (n), the first multiplex control terminal Mux1 and the second multiplex control terminal Mux2 are high-level signals. The signal of the reset signal terminal RST (n−1)/RST (n) is a low-level signal, such that the first transistor T1 and the seventh transistor T7 in each of the pixel circuits in the m-th row and the (n−1)-th column and in the m-th row and the n-th column are turned on, the initial signal of the initial signal terminal Vint is provided to the first node N1 and the first electrode of the light emitting element L to initialize the first node N1 and the first electrode of the light emitting element L, and the initial signal of the initial signal terminal Vint is provided to the first electrode of the light emitting element to ensure that the light emitting element does not emit light. The signal of the data reset control terminal RST_Data is a low-level signal, such that the data reset transistor RT in the data reset circuit is turned on, and the signal of the data initial signal terminal is written to the (n−1)-th and n-th data signal lines to reset the signals of the (n−1)-th and n-th data signal lines, at which point the signals of both the data signal terminal Data (n−1) of the pixel circuit in the m-th row and the (n−1)-th column and the data signal terminal Data (n) of the pixel circuit in the m-th row and the n-th column are the signal of the data initial signal terminal. The signals of the scan signal terminal Gate (n−1)/Gate (n) and the light emitting signal terminal EM (n−1)/EM (n) are high-level signals, such that the second transistor T2, the fourth transistor T4, the fifth transistor T5 and the sixth transistor T6 in each of the pixel circuits in the m-th row and the (n−1)-th column and in the m-th row and the n-th column are turned off. The signals of the first multiplex control terminal Mux1 and the second multiplex control terminal Mux2 are high-level signals, such that the first multiplex transistor MT1 and the second multiplex transistor MT2 in the multiplexer circuit are turned off. In this stage, the light emitting element L driven by each of the pixel circuits in the m-th row and the (n−1)-th column and in the m-th row and the n-th column does not emit light.

A second stage C2, which may be referred to as a data writing stage, may include a first sub-stage C21 and a second sub-stage C22.

In the first sub-stage C21, the signals of the scan signal terminal Gate (n−1)/Gate (n) and the first multiplex control terminal MUX1 are low-level signals, and the signals of the reset signal terminal RST (n−1)/RST (n), the light emitting signal terminal EM (n−1)/EM (n), the second multiplex control terminal MUX2 and the data reset control terminal RST_Data are high-level signals. Since the signals of the reset signal terminal RST (n−1)/RST (n) and the light emitting signal terminal EM (n−1)/EM (n) are high-level signals, the first transistor T1, the seventh transistor T7, the fifth transistor T5 and the sixth transistor T6 in each of the pixel circuits in the m-th row and the (n−1)-th column and in the m-th row and the n-th column are all turned off. The signal of the scan signal terminal Gate (n−1)/Gate (n) is a low-level signal, such that the second transistor T2 and the fourth transistor T4 in each of the pixel circuits in the m-th row and the (n−1)-th column and in the m-th row and the n-th column are turned on. The signal of the first multiplex control terminal MUX1 is a low-level signal, the first multiplex transistor MT1 is turned on, and the signal of the data output terminal DTh is written to the data signal terminal Data (n−1) of the pixel circuit in the m-th row and the (n−1)-th column through the (n−1)-th data signal line. For the pixel circuit in the m-th row and the (n−1)-th column, because the second transistor T2 and the fourth transistor T4 are turned on, the data signal of the data signal terminal Data (n−1) is written to the third node N3. Because the voltage difference between the third node N3 and the first node N1 is greater than the threshold voltage Vth of the third transistor, the third transistor T3 is turned on, and the signal of the third node N3 is written to the first node N1 through the turned-on third transistor T3 and second transistor T2 until the voltage value of the first node N1 equals to the sum of the data voltage of the data signal terminal Data (n−1) and the threshold voltage of the third transistor T3, i.e., the voltage value of the first node N1 satisfies Vd1+Vth, wherein Vd1 is the data voltage of the data signal terminal Data (n−1), at which point the third transistor T3 is turned off. The signal of the second multiplex control terminal MUX2 is a high-level signal, the second multiplex transistor MT2 is turned off, and the signal of the data output terminal DTh cannot be written to the data signal terminal Data (n) of the pixel circuit in the m-th row and the n-th column through the n-th data signal line. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

In the second substage C22, the signals of the scan signal terminal Gate (n−1)/Gate (n) and the second multiplex control terminal MUX2 are low-level signals, and the signals of the reset signal terminal RST (n−1)/RST (n), the light emitting signal terminal EM (n−1)/EM (n), the first multiplex control terminal MUX1 and the data reset control terminal RST_Data are high-level signals. Since the signals of the reset signal terminal RST (n−1)/RST (n) and the light emitting signal terminal EM (n−1)/EM (n) are high-level signals, the first transistor T1, the seventh transistor T7, the fifth transistor T5 and the sixth transistor T6 in each of the pixel circuits in the m-th row and the (n−1)-th column and in the m-th row and the n-th column are all turned off. The signal of the scan signal terminal Gate (n−1)/Gate (n) is a low-level signal, such that the second transistor T2 and the fourth transistor T4 in each of the pixel circuits in the m-th row and the (n−1)-th column and in the m-th row and the n-th column are turned on. The signal of the second multiplex control terminal MUX2 is a low-level signal, the second multiplex transistor MT2 is turned on, and the signal of the data output terminal DTh is written to the data signal terminal Data (n) of the pixel circuit in the m-th row and the n-th column through the n-th data signal line. For the pixel circuit in the m-th row and the n-th column, because the second transistor T2 and the fourth transistor T4 are turned on, the data signal of the data signal terminal Data (n) is written to the third node N3. Because the voltage difference between the third node N3 and the first node N1 is greater than the threshold voltage Vth of the third transistor, the third transistor T3 is turned on, and the signal of the third node N3 is written to the first node N1 through the turned-on third transistor T3 and second transistor T2 until the voltage value of the first node N1 equals to the sum of the data voltage of the data signal terminal Data (n) and the threshold voltage of the third transistor T3, i.e., the voltage value of the first node N1 satisfies Vd2+Vth, wherein Vd2 is the data voltage of the data signal terminal Data (n), at which point the third transistor T3 is turned off. The signal of the first multiplex control terminal MUX1 is a high-level signal, the first multiplex transistor MT1 is turned off, and the signal of the data output terminal DTh cannot be written to the data signal terminal Data (n) of the pixel circuit in the m-th row and the (n−1)-th column through the (n−1)-th data signal line. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

In a third stage C3, which may be referred to as a light emitting stage, the signals of the reset signal terminal RST (n−1)/RST (n), the scan signal terminal Gate (n−1)/Gate (n), the first multiplex control terminal MUX1, the second multiplex control terminal MUX2 and the data reset control terminal RST_Data are high-level signals, and the signal of the light emitting signal terminal EM (n−1)/EM (n) is a low-level signal. The signals of the reset signal terminal RST (n−1)/RST (n) and the scan signal terminal Gate (n−1)/Gate (n) are high-level signals, such that the first transistor T1, the second transistor T2, the fourth transistor T4 and the seventh transistor T7 in each of the pixel circuits in the m-th row and the (n−1)-th column and in the m-th row and the n-th column are turned off. The signals of the first multiplex control terminal MUX1 and the second multiplex control terminal MUX2 are high-level signals, such that both the first multiplex transistor MT1 and the second multiplex transistor MT2 in the multiplexer circuit 30 are turned off. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light. The signal of the light emitting signal terminal EM (n−1)/EM (n) is a low-level signal, such that the fifth transistor T5 and the sixth transistor T6 in each of the pixel circuits in the m-th row and the (n−1)-th column and in the m-th row and the n-th column are turned on, the voltage signal of the first power supply terminal VDD is written to the third node N3 through the fifth transistor T5, the first node N1 maintains the voltage from the previous stage, and the third transistor T3 is turned on. The power output from the first power supply terminal VDD provides a drive current to the first electrode of the light emitting element L through the turned-on fifth transistor T5, third transistor T3 and sixth transistor T6 to drive the light emitting element L to emit light.

In the driving process of the pixel circuit in the m-th row and the (n−1)-th column, the drive current flowing through the third transistor T3 (driving transistor) is determined by the voltage difference between its control electrode and first electrode. Therefore, the drive current of the third transistor T3 is:

$$I=K*(Vgs-Vth)^2=K*[(Vdd-Vd1+|Vth|)-Vth]^2=K*[(Vdd-Vd1]^2,$$

wherein I is the drive current flowing through the third transistor T3, that is, the drive current driving the light emitting element, K is a constant, Vgs is the voltage difference between the control electrode and the first electrode of the third transistor T3, Vd1 is the data voltage of the data signal terminal Data (n−1), and Vdd is the supply voltage output from the first power supply line VDD.

In the driving process of the pixel circuit in the m-th row and the n-th column, the drive current flowing through the third transistor T3 (driving transistor) is determined by the voltage difference between its control electrode and first electrode. Therefore, the drive current of the third transistor T3 is:

$$I=K*(Vgs-Vth)^2=K*[(Vdd-Vd2+|Vth|)-Vth]^2=K*[(Vdd-Vd2]^2,$$

wherein I is the drive current flowing through the third transistor T3, that is, the drive current driving the light emitting element, K is a constant, Vgs is the voltage difference between the control electrode and the first electrode of the third transistor T3, Vd2 is the data voltage of the data signal terminal Data (n), and Vdd is the supply voltage output from the first power supply line VDD.

In the process of the display substrate of the present disclosure, in the first stage, i.e., before the signals of the Gate (n−1) and Gate (n) are active level signals, the signals of the (n−1)-th and n-th data signal lines are reset, to prevent the data signal provided from the (n−1)-th data signal line to the data signal terminal of the pixel circuit in the (m−1)-th row and the (n−1)-th column from being written to the pixel circuit in the m-th row and the (n−1)-th column and prevent the data signal provided from the n-th data signal line to the data signal terminal of the pixel circuit in the (m−1)-th row and the n-th column from being written to the pixel circuit in the m-th row and the n-th column, thereby avoiding the situation where the low-level signal provided from the n-th data signal line to the data signal terminal of the pixel circuit in the m-th row and the n-th column cannot be written to the pixel circuit in the m-th row and the n-th column when the high-level signal is provided from the n-th data signal line to the data signal terminal of the pixel circuit in the (m−1)-th row and the n-th column and the low-level signal is provided from the n-th data signal line to the data signal terminal of the pixel circuit in the m-th row and the n-th column, thereby improving the display effect of the display substrate.

A working process of the display substrate in accordance with an exemplary example will be described below in conjunction with FIGS. 6, 7 and 11. The working process of the display substrate in accordance with the exemplary example may include the following stages.

In a first stage P1, which may be referred to as a reset stage, the signal of the reset signal terminal RST (n−1)/RST (n) is a low-level signal, and the signals of the scan signal terminal Gate (n−1)/Gate (n), the light emitting signal terminal EM (n−1)/EM (n), the first multiplex control terminal Mux1, the second multiplex control terminal Mux2 and the data reset control terminal RST_Data are high-level signals. The signal of the reset signal terminal RST (n−1)/RST (n) is a low-level signal, such that the first transistor T1 and the seventh transistor T7 in each of the pixel circuits in the m-th row and the (n−1)-th column and in the m-th row and the n-th column are turned on, the initial signal of the initial signal terminal Vint is provided to the first node N1 and the first electrode of the light emitting element L to initialize the first node N1 and the first electrode of the light emitting element L, and the initial signal of the initial signal terminal Vint is provided to the first electrode of the light emitting element to ensure that the light emitting element does not emit light. The signals of the scan signal terminal Gate (n−1)/Gate (n) and the light emitting signal terminal EM (n−1)/EM (n) are high-level signals, such that the second transistor T2, the fourth transistor T4, the fifth transistor T5 and the sixth transistor T6 in each of the pixel circuits in the m-th row and the (n−1)-th column and in the m-th row and the n-th column are turned off. The signals of the first multiplex control terminal Mux1 and the second multiplex control terminal Mux2 are high-level signals, such that the first multiplex transistor MT1 and the second multiplex transistor MT2 in the multiplexer circuit are turned off. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

A second stage P2, which may be referred to as a data writing stage, may include a first sub-stage P21 and a second sub-stage P22.

In the first sub-stage P21, the signals of the scan signal terminal Gate (n−1)/Gate (n) and the first multiplex control terminal MUX1 are low-level signals, and the signals of the reset signal terminal RST (n−1)/RST (n), the light emitting signal terminal EM (n−1)/EM (n), the second multiplex control terminal MUX2 and the data reset control terminal RST_Data are high-level signals. Because the signals of the reset signal terminal RST (n−1)/RST (n) and the light emitting signal terminal EM (n−1)/EM (n) are high-level signals, the first transistor T1, the seventh transistor T7, the fifth transistor T5 and the sixth transistor T6 in each of the pixel circuits in the m-th row and the (n−1)-th column and in the m-th row and the n-th column are all turned off. The signal of the scan signal terminal Gate (n−1)/Gate (n) is a low-level signal, such that the second transistor T2 and the fourth transistor T4 in each of the pixel circuits in the m-th row and the (n−1)-th column and in the m-th row and the n-th column are turned on. The signal of the first multiplex control terminal MUX1 is a low-level signal, the first multiplex transistor MT1 is turned on, and the signal of the data output terminal DTh is written to the data signal terminal Data (n−1) of the pixel circuit in the pixel circuits in the m-th row and the (n−1)-th column through the (n−1)-th data signal line. For the pixel circuit in the m-th row and the (n−1)-th column, because the second transistor T2 and the fourth transistor T4 are turned on, the data signal of the data signal terminal Data (n−1) is written to the third node N3. Because the voltage difference between the third node N3 and the first node N1 is greater than the threshold voltage Vth of the third transistor, the third transistor T3 is turned on, and the signal of the third node N3 is written to the first node N1 through the turned-on third transistor T3 and second transistor T2 until the voltage value of the first node N1 equals to the sum of the data voltage of the data signal terminal Data (n−1) and the threshold voltage of the third transistor T3, i.e., the voltage value of the first node N1 satisfies Vd1+Vth, wherein Vd1 is the data voltage of the data signal terminal Data (n−1), at which point the third transistor T3 is turned off. The signal of the second multiplex control terminal MUX2 is a high-level signal, the second multiplex transistor MT2 is turned off, and the signal of the data output terminal DTh cannot be written to the data signal terminal Data (n) of the pixel circuit in the m-th row and the n-th column through the n-th data signal line. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

In the second sub-stage P22, the signals of the scan signal terminal Gate (n−1)/Gate (n) and the second multiplex control terminal MUX2 are low-level signals, and the signals of the reset signal terminal RST (n−1)/RST (n), the light emitting signal terminal EM (n−1)/EM (n), the first multiplex control terminal MUX1 and the data reset control terminal RST_Data are high-level signals. Since the signals of the reset signal terminal RST (n−1)/RST (n) and the light emitting signal terminal EM (n−1)/EM (n) are high-level signals, the first transistor T1, the seventh transistor T7, the fifth transistor T5 and the sixth transistor T6 in each of the pixel circuits in the m-th row and the (n−1)-th column and in the m-th row and the n-th column are all turned off. The signal of the scan signal terminal Gate (n−1)/Gate (n) is a low-level signal, such that the second transistor T2 and the fourth transistor T4 in each of the pixel circuits in the m-th row and the (n−1)-th column and in the m-th row and the n-th column are turned on. The signal of the second multiplex control terminal MUX2 is a low-level signal, the second multiplex transistor MT2 is turned on, and the signal of the data output terminal DTh is written to the data signal terminal Data (n) of the pixel circuit in the m-th row and the n-th column through the n-th data signal line. For the pixel circuit in the m-th row and the n-th column, because the second transistor T2 and the fourth transistor T4 are turned on, the data signal of the data signal terminal Data (n) is written to the third node N3. Because the voltage difference between the third node N3 and the first node N1 is greater than the threshold voltage Vth of the third transistor, the third transistor T3 is turned on, and the signal of the third node N3 is written to the first node N1 through the turned-on third transistor T3 and second transistor T2 until the voltage value of the first node N1 equals to the sum of the data voltage of the data signal terminal Data (n) and the threshold voltage of the third transistor T3, i.e., the voltage value of the first node N1 satisfies Vd2+Vth, wherein Vd2 is the data voltage of the data signal terminal Data (n), at which point the third transistor T3 is turned off. The signal of the first multiplex control terminal MUX1 is a high-level signal, the first multiplex transistor MT1 is turned off, and the signal of the data output terminal DTh cannot be written to the data signal terminal Data (n−1) of the pixel circuit in the m-th row and the (n−1)-th column through the (n−1)-th data signal line. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light.

In a third stage P3, which may be referred to as a light emitting stage, the signals of the reset signal terminal RST (n−1)/RST (n), the scan signal terminal Gate (n−1)/Gate (n), the first multiplex control terminal MUX1, the second multiplex control terminal MUX2 and the data reset control terminal RST_Data are high-level signals, and the signals of the light emitting signal terminal EM (n−1)/EM (n) and the data reset control terminal RST_Data are low-level signals. The signals of the reset signal terminal RST (n−1)/RST (n) and the scan signal terminal Gate (n−1)/Gate (n) are high-level signals, such that the first transistor T1, the second transistor T2, the fourth transistor T4 and the seventh transistor T7 in each of the pixel circuits in the m-th row and the (n−1)-th column and in the m-th row and the n-th column are turned off. The signals of the first multiplex control terminal MUX1 and the second multiplex control terminal MUX2 are high-level signals, such that both the first multiplex transistor MT1 and the second multiplex transistor MT2 in the multiplexer circuit 30 are turned off. The signal of the data reset control terminal RST_Data is a high-level signal, such that the data reset transistor RT in the data reset circuit is turned off. In this stage, the light emitting element L driven by each of the pixel circuits in the m-th row and the (n−1)-th column and in the m-th row and the n-th column does not emit light. The signal of the light emitting signal terminal EM (n−1)/EM (n) is a low-level signal, such that the fifth transistor T5 and the sixth transistor T6 in each of the pixel circuits in the m-th row and the (n−1)-th column and in the m-th row and the n-th column are turned on, the voltage signal of the first power supply terminal VDD is written to the third node N3 through the fifth transistor T5, the first node N1 maintains the voltage from the previous stage, and the third transistor T3 is turned on. The power output from the first power supply terminal VDD provides a drive current to the first electrode of the light emitting element L through the turned-on fifth transistor T5, third transistor T3 and sixth transistor T6 to drive the light emitting element L to emit light. The signal of the data reset control terminal RST_Data is a low-level signal, such that the data reset transistor RT in the data reset circuit is turned on, and the signal of the data initial signal terminal is written to the (n−1)-th and n-th data signal lines to reset the signal of the (n−1)-th and n-th data signal lines.

In the driving process of the pixel circuit in the m-th row and the (n−1)-th column, the drive current flowing through the third transistor T3 (driving transistor) is determined by the voltage difference between its control electrode and first electrode. Therefore, the drive current of the third transistor T3 is:

$$I=K^*(Vgs-Vth)^2=K^*[(Vdd-Vd1+|Vth|)-Vth]^2=K^*[(Vdd-Vd1]^2,$$

wherein I is the drive current flowing through the third transistor T3, that is, the drive current driving the light emitting element, K is a constant, Vgs is the voltage difference between the control electrode and the first electrode of the third transistor T3, Vd1 is the data voltage of the data signal terminal Data (n−1), and Vdd is the supply voltage output from the first power supply line VDD.

In the driving process of the pixel circuit in the m-th row and the n-th column, the drive current flowing through the third transistor T3 (driving transistor) is determined by the voltage difference between its gate electrode and first electrode. Therefore, the drive current of the third transistor T3 is:

$$I=K^*(Vgs-Vth)^2=K^*[(Vdd-Vd2+|Vth|)-Vth]2=K^*[(Vdd-Vd2]^2,$$

wherein I is the drive current flowing through the third transistor T3, that is, the drive current driving the light emitting element, K is a constant, Vgs is the voltage difference between the control electrode and the first electrode of the third transistor T3, Vd2 is the data voltage of the data signal terminal Data (n), and Vdd is the supply voltage output from the first power supply line VDD.

In the process of the display substrate of the present disclosure, after the data signals are written to in the pixel circuits in the m-th row and the (n−1)-th column and in the m-th row and the n-th column and before the pixel circuits in the (m+1)-th row are displayed, the signals of the (n−1)-th and n-th data signal lines are reset, at which point the signals of the data signal terminal of the pixel circuit in the (m+1)-th row and the (n−1)-th column and the data signal terminal of the pixel circuit in the (m+1)-th row and the n-th column are the signal of the data initial signal terminal, so that when the pixel circuits in the (m+1)-th row are displayed, the data signal provided from the (n−1)-th data signal line to the data signal terminal of the pixel circuit in the m-th row and the (n−1)-th column can be prevented from being written to the pixel circuit in the (m+1)-th row and the (n−1)-th column, and the data signal provided from the n-th data signal line to the data signal terminal of the pixel circuit in the m-th row and the n-th column can be prevented from being written to the pixel circuit in the (m+1)-th row and the n-th column, thereby avoiding the situation where the low-level signal provided from the n-th data signal line to the data signal terminal of the pixel circuit in the m-th row and the n-th column cannot be written to the pixel circuit in the m-th row and the n-th column when the high-level signal is provided from the n-th data signal line to the data signal terminal of the pixel circuit in the (m−1)-th row and the n-th column and the low-level signal is provided from the n-th data signal line to the data signal terminal of the pixel circuit in the m-th row and the n-th column, thereby improving the display effect of the display substrate.

An example of the present disclosure also provides a driving method of the display substrate. The driving method of the display substrate in accordance with by the example of the present disclosure is used to drive the display substrate. The driving method of the display substrate in accordance with the example of the disclosure may include:

a data reset circuit providing a signal of a data initial signal terminal to N data signal lines under the control of a data reset control terminal.

An example of the present disclosure also provides a display device including a display substrate.

The display substrate is the display substrate in accordance with any one of the foregoing examples, and its implementation principle and implementation effect are similar to the foresaid implementation principle and implementation effect and will not be repeated herein.

In an exemplary example, the display device may be any device that displays contents, whether they are moving (for example, videos) or fixed (for example, still images) and whether they are texts or images. More specifically, the display device may be one of various electronic devices, may be implemented in or associated with various electronic devices, including but not limited to a mobile phone, a wireless device, a personal data assistant, a handheld or portable computer, a GPS receiver/navigator, a camera, an MP4 video player, a camcorder, a game console, a watch, a clock, a calculator, a TV monitor, a flat panel display, a computer monitor, a car display (e.g., an odometer display), a navigator, a cockpit controller and/or display, a camera view display (e.g., a display of a rear-view camera in a car), an electronic photo, an electronic billboard or sign, a projector, a building structure, a package and an aesthetic structure (e.g., for a display of an image of a piece of jewelry), for example. The specific form of the above-mentioned display device is not limited in the examples of the present disclosure.

The drawings in the present disclosure relate only to the structures involved in the examples of the present disclosure, and other structures may be described with reference to conventional designs.

For the sake of clarity, the thickness and size of a layer or a micro structure is enlarged in the accompanying drawings used to describe the examples of the present disclosure. It can be understood that when an element such as a layer, film, region or substrate is described as being "on" or "under" another element, this element may be "directly" located "on" or "under" the another element, or an intermediate element may exist.

Although the embodiments disclosed in the present disclosure are described as above, the described contents are only embodiments which are adopted in order to facilitate understanding of the present invention, and are not intended to limit the present disclosure. Any skilled person in the art to which the present invention pertains can make any modifications and alterations in forms and details of implementation without departing from the spirit and scope of the present invention. However, the patent protection scope of the present invention should be subject to the scope defined by the appended claims.

The invention claimed is:

1. A display substrate comprising M rows and N columns of sub-pixels, N data signal lines and at least one data reset circuit, wherein at least one sub-pixel comprises a pixel circuit; an i-th data signal line is connected to an i-th column of pixel circuits, M≥1, N≥1 and 1≤i≤N; and the data reset circuit, electrically connected to a data reset control terminal, a data initial signal terminal and the N data signal lines, is configured to provide a signal of the data initial signal terminal to the N data signal lines under control of the data reset control terminal, wherein the at least one sub-pixel further comprises a light emitting element, and the pixel circuit is configured to drive the light emitting element to emit light;

the pixel circuit comprises a first transistor, a second transistor, a third transistor, a fourth transistor, a fifth transistor, a sixth transistor, a seventh transistor and a capacitor;

a control electrode of the first transistor is connected to a reset signal terminal, a first electrode of the first transistor is connected to an initial signal terminal, and a second electrode of the first transistor is connected to a first node;

a control electrode of the second transistor is connected to a scan signal terminal, a first electrode of the second transistor is connected to the first node, and a second electrode of the second transistor is connected to a second node;

a control electrode of the third transistor is connected to the first node, a first electrode of the third transistor is connected to a third node, and a second electrode of the third transistor is connected to the second node;

a control electrode of the fourth transistor is connected to the scan signal terminal, a first electrode of the fourth transistor is connected to a data signal terminal, and a second electrode of the fourth transistor is connected to the third node;

a control electrode of the fifth transistor is connected to a light emitting signal terminal, a first electrode of the fifth transistor is connected to a first power supply terminal, and a second electrode of the fifth transistor is connected to the third node;

a control electrode of the sixth transistor is connected to the light emitting signal terminal, a first electrode of the sixth transistor is connected to the second node, and a second electrode of the sixth transistor is connected to a first electrode of the light emitting element;

a control electrode of the seventh transistor is connected to the reset signal terminal, a first electrode of the seventh transistor is connected to the initial signal terminal, and a second electrode of the seventh transistor is connected to the first electrode of the light emitting element; and a first terminal of the capacitor is connected to the first power supply terminal, and a second terminal of the capacitor is connected to the first node;

the light emitting element is connected to the pixel circuit and a second power supply terminal respectively; and the i-th data signal line is electrically connected to a data signal terminal of the i-th column of pixel circuits, further comprising a multiplexer circuit, wherein the multiplexer circuit, electrically connected to R multiplex control terminals, S data output terminals and the N data signal lines respectively, is configured to output signals of the S data output terminals to the N data signal lines in a way of time sharing under the control of the R multiplex control terminals, S=N/R and R is a positive integer greater than or equal to 2, wherein for at least one pixel circuit, cut-off time before which the reset signal terminal receives active level signals is not later than start time at which the scan signal terminal receives the active level signals, and cut-off time before which the scan signal terminal receives the active level signals is not later than start time at which the light emitting signal terminal receives the active level signals;

time at which the R multiplex control terminals receive the active level signals is within time at which the scan signal terminal receives the active level signals, and there is no overlap among times at which different multiplex control terminals receive the active level signals; and cut-off time before which an x-th multiplex control terminal receives the active level signals is not later than start time at which a (x+1)-th multiplex control terminal receives the active level signals, $1 \leq x \leq R-1$, wherein time at which the data reset control terminal receives the active level signals does not overlap with the time at which the R multiplex control terminals receive the active level signals, wherein the time at which the data reset control terminal receives the active level signals is within the time at which the scan signal terminal receives the active level signals.

2. The display substrate according to claim 1, wherein the data reset circuit comprises N data reset transistors; and a control electrode of an i-th data reset transistor is electrically connected to the data reset control terminal, a first electrode of the i-th data reset transistor is electrically connected to the data initial signal terminal, and a second electrode of the i-th data reset transistor is electrically connected to the i-th data signal line.

3. The display substrate according to claim 1, wherein when R=2, two reset control terminals are a first reset control terminal and a second reset control terminal respectively, and the multiplexer circuit comprises S first multiplex transistors and S second multiplex transistors;

a control electrode of a t-th first multiplex transistor is electrically connected to the first reset control terminal, a first electrode of the t-th first multiplex transistor is electrically connected to a (2t−1)-th data signal line, and a second electrode of the t-th first multiplex transistor is electrically connected to a t-th column of data output terminals, $1 \leq t \leq S$; and a control electrode of a t-th second multiplex transistor is electrically connected to the second reset control terminal, a first electrode of the t-th second multiplex transistor is electrically connected to the 2t-th data signal line, and a second electrode of the t-th second multiplex transistor is electrically connected to the t-th column of data output terminals.

4. The display substrate according to claim 3, wherein the initial signal terminal and the data initial signal terminal are connected to the same signal line.

5. The display substrate according to claim 1, wherein the data reset circuit and the multiplexer circuit are located at both sides of the N data signal lines respectively, and the data reset circuit and the multiplexer circuit are arranged along an extension direction of the data signal lines.

6. The display substrate according to claim 5, wherein the data reset circuit is electrically connected to first ends of the N data signal lines, and the multiplexer circuit is electrically connected to second ends of the N data signal lines.

7. The display substrate according to claim 1, wherein cut-off time before which the data reset control terminal receives the active level signals is not later than start time at which the first multiplex control terminal receives the active level signals, or start time at which the data reset control terminal receives the active level signals is later than cut-off time before which the R-th multiplex control terminal receives the active level signals.

8. The display substrate according to claim 1, wherein the time at which the data reset control terminal receives the active level signals is within time at which the reset signal terminal receives the active level signals.

9. The display substrate according to claim 1, wherein the time at which the data reset control terminal receives the active level signals is within time at which the light emitting signal terminal receives the active level signals.

10. The display substrate according to claim 3, wherein a duration during which the data reset control terminal receives the active level signals is greater than or equal to a duration during which the multiplex control terminal receives the active level signals.

11. The display substrate according to claim 3, wherein the light emitting element comprises a micro light emitting diode, a mini light emitting diode, an organic light emitting diode or a quantum light emitting diode.

12. A display device comprising the display substrate according to claim 1.

13. A driving method of a display substrate, which is configured to drive the display substrate according to claim 1, the method comprising:

a data reset circuit providing a signal of a data initial signal terminal to N data signal lines under the control of a data reset control terminal.

* * * * *